(12) United States Patent
Oh et al.

(10) Patent No.: US 6,924,179 B2
(45) Date of Patent: Aug. 2, 2005

(54) ARRAY SUBSTRATE FOR A LIQUID CRYSTAL DISPLAY AND METHOD FOR FABRICATING THEREOF

(75) Inventors: Sang-Hun Oh, Gumi-si (KR); Yong-Min Ha, Gumi-si (KR); Jae-Deok Park, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

(21) Appl. No.: 10/761,388

(22) Filed: Jan. 22, 2004

(65) Prior Publication Data

US 2004/0149990 A1 Aug. 5, 2004

Related U.S. Application Data

(62) Division of application No. 09/971,630, filed on Oct. 9, 2001.

(30) Foreign Application Priority Data

Oct. 11, 2000 (KR) .......................................... 2000-59868
Sep. 7, 2001 (KR) .......................................... 2001-55212

(51) Int. Cl.$^7$ ........................................... H01L 21/339
(52) U.S. Cl. ....................... 438/157; 438/149; 438/151
(58) Field of Search ............................... 438/149, 151, 438/157

(56) References Cited

U.S. PATENT DOCUMENTS

| | | | |
|---|---|---|---|
| 5,731,216 A | 3/1998 | Holmberg et al. | |
| 5,852,480 A | 12/1998 | Yajima et al. | |
| 6,172,733 B1 | 1/2001 | Hong et al. | |
| 6,184,948 B1 | 2/2001 | Lee | |

FOREIGN PATENT DOCUMENTS

| | | |
|---|---|---|
| GB | 2 334 619 A1 | 8/1999 |
| JP | 09-265113 | 10/1997 |
| KR | 1998-0003745 | 3/1998 |

*Primary Examiner*—Long Pham
(74) *Attorney, Agent, or Firm*—McKenna Long & Aldridge LLP

(57) ABSTRACT

An array substrate for use in a liquid crystal display device is fabricated by the steps of forming a buffer layer on a substrate; forming a polycrystalline-silicon active layer on the buffer layer, the said active layer having an island shape; forming a gate insulation layer on the buffer layer to cover the polycrystalline-silicon active layer; forming a first metal layer on the gate insulation layer; forming a second metal layer on the first metal layer; patterning the first and second metal layer to form a gate electrode, a gate line and a gate shorting bar; forming a source contact area and a drain contact area at both sides of the polycrystalline-silicon active layer; forming an interlayer insulator on the gate insulation layer to cover the patterned first and second metal layers; patterning the interlayer insulator and the gate insulation layer so as to form a first contact hole to the source contact area and the second contact hole to a drain contact area, patterning a portion of the interlayer insulator on the gate shorting bar so as to form an etching hole, eliminating a portion of the first layer of the gate insulation layer under the etching hole, and forming a bridge portion in the second layer of the gate insulation layer under the etching hole; forming a third metal layer on the gate insulation layer and on the bridge portion; patterning the third metal layer so as to form a source electrode and a drain electrode, and removing the bridge portion when patterning the third metal layer; and forming a passivation layer on the interlayer insulator and on the patterned third metal layer.

25 Claims, 14 Drawing Sheets

(RELAED ART)

(RELAED ART)

(RELAED ART)

(RELAED ART)

(RELAED ART)

(RELAED ART)

(RELAED ART)

(RELAED ART)

(RELAED ART)

ARRAY SUBSTRATE FOR A LIQUID CRYSTAL DISPLAY AND METHOD FOR FABRICATING THEREOF

This application is a divisional of prior application Ser. No. 09/971,630 filed Oct. 9, 2001.

This application claims the benefit of Korean Patent Application Nos. 2000-59868 and 2001-55212, filed on Oct. 11, 2000 and on Sep. 7, 2001, respectively, in Korea, which is hereby incorporated by reference as if fully set forth herein.

BACKGROUND OF THE INVENTION

1. Field of the Invention

The present invention relates to a liquid crystal display device, and more particularly, to an array substrate for a liquid crystal display device.

2. Discussion of the Related Art

Until now, the cathode-ray tube (CRT) has been developed and mainly used for display systems. However, flat panel displays are beginning to make an appearance because of their small depth dimensions, desirably low weight, and low voltage power supply requirements. Presently, thin film transistor-liquid crystal displays (TFT-LCDs) with high resolution and small depth dimension are being developed.

In general, liquid crystal display (LCD) devices make use of optical anisotropy and polarization properties of liquid crystal molecules to control arrangement orientation. The arrangement direction of the liquid crystal molecules can be controlled by an applied electric field. Accordingly, when an electric field is applied to liquid crystal molecules, the arrangement of the liquid crystal molecules changes. Since refraction of incident light is determined by the arrangement of the liquid crystal molecules, display of image data can be controlled by changing the electric field applied to the liquid crystal molecules.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because of their light, thin, low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs), and pixel electrodes.

FIG. 1 is a schematic cross-sectional view illustrating a pixel of a conventional LCD panel having an inverted staggered type TFT as a switching device. As shown, the LCD panel 20 has lower and upper substrates 2 and 4 and a liquid crystal (LC) layer 10 interposed therebetween. The lower substrate 2 has a thin film transistor (TFT) "S" as a switching element that switches a voltage that changes the orientation of the LC molecules. The lower substrate 2 also includes a pixel electrode 4 on a transparent substrate 1 which is used to apply an electric field across the LC layer 10 in response to signals applied to the TFT "S". The upper substrate 4 has a color filter 8 for producing a color, and a common electrode 12 on the transparent substrate 1 and on the color filter 8. The common electrode 12 serves as an electrode that produces the electric field across the LC layer (with the assistance of the pixel electrode 14). The pixel electrode 14 is arranged over a pixel portion "P," i.e., a display area. Further, to prevent leakage of the LC layer 10, substrates 2 and 4 are sealed by a sealant 6.

Although FIG. 1 only shows one inverted staggered type TFT "S", the lower substrate 2 usually includes a plurality of TFTs as well as a plurality of pixel electrodes each contacting each TFT. In the above-mentioned panel 20, the lower substrate 2 and the upper substrate 4 are respectively formed through different processes and then attached each other.

FIG. 2 is a schematic plan view illustrating a portion of an array substrate having inverted staggered type TFTs of FIG. 1. As shown in FIG. 2, a gate shorting bar 36 and a plurality of gate pads 35 are formed in a peripheral portion of the transparent substrate 1. A plurality of gate lines 30 are transversely connected to the plurality of respective gate pads 35. A data shorting bar 46 is disposed in an edge portion of the transparent substrate 1 adjacent to the peripheral portion where the gate shorting bar 36 is disposed. A plurality of data pads 45 are electrically connected to the data shorting bar 46, and a plurality of data lines 40 are electrically connected to respective data pads 45. Each data line 40 is substantially perpendicular to the plurality of gate lines 30, and the gate lines 30 and the data lines 40 define pixel regions where each pixel electrode 14 is disposed respectively.

The plurality of data pads 45 and the data shorting bar 46 can be formed together with the plurality of data lines 40 at the same time. However, in order to reduce the fabricating process steps, the plurality of data pads 45 and the data shorting bar 46 are usually formed with the gate lines 30, and each data pad 45 is electrically connected to each data line 40 with connector through a data pad contact hole (not shown).

For more detailed explanation, the interconnection of the above-mentioned lines, pads and shorting bars is depicted in FIG. 3. As shown in FIG. 3, the plurality of gate lines can be classified into odd numbered lines 30a and even numbered lines 30b, and the plurality of gate pads 35 can also be classified into odd numbered gate pads 35a and even numbered gate pads 35b. Each odd numbered gate line 30a connects with a respective odd numbered gate pad 35a, which is electrically connected with a first shorting bar 36a, while each even numbered gate line 30b connects with a respective even numbered gate pad 35b, which is electrically connected to a second shorting bar 36b. This grouping and structure can be adapted for the data line, pad and shorting bar, thereby classifying the data lines into odd numbered data line 40a and even numbered data line 40b in FIG. 3.

As mentioned before, the odd 40a and even 40b numbered data lines are perpendicular to the plurality of gate lines 30a and 30b, and the gate lines and the data lines define a plurality of pixel regions. Thus, each pixel electrode 14 is disposed in each respective pixel region. A thin film transistor (TFT) "S" is also disposed at a corner of each pixel region. Each TFT "S" is electrically connected to the gate and data lines, and each pixel electrode 14 electrically connects with each TFT "S."

Still referring to FIG. 3, the first and second gate shorting bars 36a and 36b are parallel with each other and perpendicular to the gate lines 30a and 30b. Additionally, these shorting bars 36a and 36b are formed together when the gate lines 30a and 30b are formed, and the second gate shorting bar 36b is disposed in a further outer portion of the transparent substrate 1 than the first gate shorting bar 36a. The first gate shorting bar 36a is electrically connected to the odd numbered gate lines 30a directly and to the even numbered gate lines 30b through a plurality of first connecting lines 31. Namely, each first connecting line 31 protrudes from the first gate shorting bar 36a and has an L-shape to connect the first gate shorting bar 36a to the corresponding even numbered gate pad 35b. However, the odd numbered gate pads 35a are directly connected to the first gate shorting bar 36a. According to this structure, the first shorting bar 36a prevents discharge of static electricity from occurring in the odd and even numbered gate lines 30a and 30b during fabrication processes. In other words, because transparent glass substrates are conventionally used for substrates of LCD devices, any static electricity generated during manufacturing processes will flow into array pattern portions of the array substrate. Accordingly, the TFTs, the gate lines and the data lines are all susceptible to significant damage as a result of any discharge of the static electricity. To prevent any damage due to any static electrical discharge, shorting bars are connected with gate lines.

In FIG. 3, the first connecting line 31 is disconnected for short/open-circuit test of the gate lines in a later manufacturing step. Namely, the TFTs "S" are tested for proper operation using the first and second gate shorting bars 36a and 36b. The first gate shorting bar 36a is connected to only the odd numbered gate lines 30a by way of cutting the first connecting lines 31. Additionally, only the second gate shorting bar 36b is connected to the even numbered gate lines using a second connecting line 34. This second connecting line 34 electrically connects the second gate shorting bar 36b to the even numbered gate pad 35b through contact holes that are respectively formed on the second gate shorting bar 36a and on a portion of the disconnected first connecting line 31. The second connecting line 34 can be formed with the data lines 40a and 40b or with the pixel electrodes 14. Although FIG. 3 depicts the gate lines, the gate pads and the gate shorting bars, the above-mentioned connections and configuration can be adapted to the data lines, pads and shorting bars.

After the short/open-circuit test, the array substrate 2 is attached to the color filter substrate. Thereafter, the peripheral portions of the array substrate 2 are cut along line A—A or B—B in order to detach unnecessary areas from the array substrate 2.

FIGS. 4A to 4D are cross-sectional views taken along line IV—IV of FIG. 3 and show conventional fabricating processes of an array substrate having inverted staggered type TFTs "S" of FIG. 3.

Referring to FIG. 4A, a first metal layer is formed on the transparent substrate 1, and then a positive photo resist is deposited on the first metal layer. The deposited photo resist is exposed to light using a first mask and then developed. Thereafter, the first metal is patterned using an etchant, and then the residual photo resist on the patterned metal layer is removed, thereby forming a gate electrode 32 and the first connecting line 31. At this time, the first and second gate shorting bars 36a and 36b (in FIG. 3) are also formed. Further, the odd and even numbered gate lines 30a and 30b and pads 35a and 35b (in FIG. 3) are formed together with the gate electrode 32. Additionally, the data shorting bars and data pads (not shown) can be formed at the time when the gate electrode 32 is formed.

Now, referring to FIG. 4B, a gate insulation layer 34, which is silicon nitride ($SiN_x$) or silicon oxide ($SiO_x$), is formed on an entire surface of the transparent substrate 1 and covers the patterned first metal layer. Then, an active layer 37 (i.e., a pure amorphous silicon (a-Si:H)) and an ohmic contact layer 38 (i.e., a doped amorphous silicon ($n^+$ a-Si:H)) are formed in series upon the gate insulation layer 34, especially over the gate electrode 32.

In FIG. 4C, a second metal layer, which is molybdenum (Mo), is formed upon an entire surface of the gate insulation layer 34, thereby covering the active layer 37 and ohmic contact layer 38. Thereafter, a positive photo resist is formed on the Mo metal layer, exposed using a mask, and then developed in a desired pattern. The Mo metal layer is etched using an etchant, thereby forming a source electrode 42 and a drain electrode 44. The source and drain electrodes 42 and 44 are spaced apart from each other and overlap opposite ends of the gate electrode 32. The data line 40 is also formed with the source and drain electrodes 42 and 44. Thereafter, a portion of the ohmic contact layer 38 disposed upon the active layer 37 is etched using the source and drain electrodes 42 and 44 as masks, thereby forming first and second ohmic contact layers 38a and 38b and a channel region-between the source electrode 42 and the drain electrode 44. Therefore, the inverted staggered type TFT "S" of FIG. 3, which includes the gate electrode 32, the active layer 37, the first and second ohmic contact layers 38a and 38b, and the source and drain electrodes 42 and 44, is complete. Further, the second connecting line 34 of FIG. 3 can be formed with the source and drain electrodes 42 and 44.

Still referring to FIG. 4C, a portion of the gate insulation layer on the first connecting line 31 is removed to expose a portion of the first connecting line 31. Thereafter, the exposed portion of the first connecting line 31 is eliminated in order to electrically cut the first connecting line 31.

In FIG. 4D, a passivation layer 45 is formed on and over an entire surface of the transparent substrate 1 in order to cover the inverted staggered type TFT and gate insulation layer 34. The passivation layer 45 is silicon nitride ($SiN_x$), silicon oxide ($SiO_x$) or benzocyclobutene (BCB). Then, a photo resist 47 is formed on the passivation layer 45 using a spin coat method, and then exposed to light using a mask. Thereafter, the photo resist 47 is developed to form an etching hole 48 over the drain electrode 44.

After forming the etching hole 48, the array substrate is put into an etching chamber in order to form a drain contact hole 49 of FIG. 4E. Namely, a portion of the passivation layer 45 over the drain electrode 44, as shown in FIG. 4E, is removed to form the drain contact hole 49. Thereafter, the photo resist formed on the passivation layer 45 is completely eliminated. Referring to FIG. 4E, a transparent conductive material including at least indium-tin-oxide (ITO) or indium-zinc-oxide (IZO) is deposited and patterned to form pixel electrode 14 that connects with the drain electrode 44 through the drain contact hole 49.

The conventional array substrate for use in the LCD device is commonly fabricated by the above-mentioned processes. However, in a large LCD device that needs to have high resolution, a signal delay may occur on the gate lines due to electrical resistance of the gate lines. Therefore, cross talk may occur between the gate lines and the pixel electrodes, thereby deteriorating image quality.

In order to overcome this problem, aluminum (Al) is conventionally used as a metal for the first metal layer because of its low resistance and reduced signal delay. However, pure aluminum is chemically weak when exposed to acidic processing and may result in formation of hillocks during high temperature processing. Accordingly, multi-layered aluminum structures are used for the first metal layer. Namely, the aluminum (Al) layer is stacked with a molybdenum (Mo) layer that has high corrosion resistance and durability.

When the molybdenum (Mo) layer is formed on the first metal layer (i.e., the aluminum layer) in the above-mentioned formation of the array substrate, a deposition process that forms the Mo layer on the Al layer is required. In addition, etching the Mo layer and etching the Al layer are also necessary, respectively. In these etching processes, a different etchant is needed for each metal layer. Thus, this double-layered structure decreases manufacturing yield and increases a chance to deteriorate the array substrate, thereby raising an occurrence of defects.

The double-layered structure in the array substrate will be explained in accordance with FIGS. 5, 6A–6E, and 7A–7E. Here, the array substrate has coplanar type TFTs as switching devices.

Amorphous silicon (a-Si) is widely used as an active layer of the TFT in an array substrate for use in liquid crystal display (LCD) devices. That is because amorphous silicon is possibly formed on the low cost glass substrate at a low temperature to form the large LCD panel. However, the TFT including polycrystalline silicon (poly-Si) for use in the liquid crystal display device has been researched and developed. It is easy to obtain fast response time in display when using the polycrystalline silicon as an element of the TFT in the liquid crystal display device rather than when using the amorphous silicon as an element of the TFT. Namely, field effect mobility in poly-Si is 100 to 200 times faster than that in a-Si. Additionally, the poly-Si has a good stability against light and temperature variation.

Now, the coplanar type TFT having poly-Si as an active layer will be explained. FIG. 5 is a schematic partial plan view of an array substrate having coplanar type TFTs, FIGS. 6A to 6E are cross-sectional views taken along the line VI—VI of FIG. 5, and FIGS. 7A to 7E are cross-sectional views taken along the line VII—VII of FIG. 5.

Referring to FIG. 5, gate lines 51 are arranged transversely and data lines 71 are arranged in a longitudinal direction perpendicular to the gate lines 51. The gate lines 51 and data lines 71 define pixel regions, and each pixel electrode 91 is positioned in each pixel region. Although as shown in FIG. 5 the pixel electrodes 91 overlap the gate lines 51 and data lines 71, it is not required that the gate lines 51 overlap the data lines 71. At one corner of each pixel region, a coplanar type TFT "T" is positioned near the crossover point of each gate line 51 and data line 71. At the ends of the gate lines 51, a gate driving circuit "G" is electrically connected to all gate lines 51. Further, all of the data lines 71 are also electrically connected to a data driving circuit (not shown) at the ends of the data lines 71. A gate shorting bar 54 is disposed parallel with the data lines 71 at the peripheral portion of the substrate. Also, a data shorting bar (not shown) is disposed parallel with the gate lines 51 at the other adjacent peripheral portion of the substrate.

In the coplanar type TFT "T" of FIG. 5, a gate electrode 53 extending from the gate line 51 is disposed over an active layer 50 including polycrystalline silicon. A source electrode 72a extending from the data line 71 contacts the active layer 50 through a first contact hole 61, and a drain electrode 72b positioned opposite to the source electrode 72a contacts the active layer 50 through a second contact hole 62. Further, a portion of the pixel electrode 91 contacts the drain electrode 72b through a third contact hole 81.

The fabrication processes will be explained in accordance with FIGS. 6A–6E and 7A–7E. FIGS. 6A to 6E show the fabrication process steps of the TFT "T" of FIG. 5, and FIGS. 7A to 7E show the fabrication process steps of the shorting bar 54 of FIG. 5, respectively corresponding to FIGS. 6A to 6E.

Referring to FIGS. 6A and 7A, a buffer layer 24 is formed on a transparent substrate 10, and then the active layer 50 (i.e., polycrystalline silicon) having an island shape is formed on the buffer layer 24. Therefore, the buffer layer 24 and the active layer 50 are stacked in an area for the TFT, while only the buffer layer 24 is stacked in an area for the shorting bar of FIG. 5.

In FIGS. 6B and 7B, a gate insulation layer 26 that is made from silicon nitride or silicon oxide is formed on an entire surface of the buffer layer 24 to cover the active, layer 50. Thereafter, a first metal layer 52a and a second metal layer 52b are formed in series on the gate insulation layer 26. The first metal layer 52a is usually a metallic material having a low resistance, such as pure aluminum or aluminum alloy (for example, aluminum neodymium (AlNd)). The second metal layer 52b is usually a metallic material having high corrosion resistance and durability, such as molybdenum. Thus, the second metal layer 52b protects the first metal layer 52a and prevents the formation of hillocks. Then, the first and second metal layers 52a and 52b are patterned together in order to form the gate electrode 53 over the active layer 50, the shorting bar 54 in a periphery of the substrate, and the gate lines 51 of FIG. 5. All the elements made of the first and second metal layers 52a and 52b have the double-layered structure as shown in FIGS. 6B and 7B.

Still referring to FIGS. 6B and 7B, after patterning the first and second layers 52a and 52b, an ion doping process is performed to the active layer 50 using the gate electrode 53 as a mask. Namely, the active layer 50 is introduced by $n^+$(or $p^+$) ion doping (plasma doping) using the gate electrode 53 as a mask, and thus a source contact area 50a and a drain contact area 50b are formed at both sides of the active layer 50. At this time, the gate electrode 53 acts as an ion-stopper that prevents the dopant ($n^+$ or $p^+$ ion) from penetrating into a portion of polycrystalline silicon (the active layer 50) under the gate electrode 53. Therefore, the portion of active layer 50 under the gate electrode 53 remains as a pure silicon area, while the source and drain contact areas 50a and 50b doped by the dopant become impure silicon areas.

Now, referring to FIGS. 6C and 7C, an interlayer insulator 60, which is made of silicon nitride or silicon oxide, is formed on the gate insulation layer 26 to cover the patterned first and second metal layer 52a and 52b. Thereafter, the first contact hole 61 to the source contact area 50a and the second contact hole 62 to the drain contact area 50b are formed by patterning both the interlayer insulator 60 and the gate insulation layer 26. An etching hole 64 to the shorting bar 54 is formed at this time with the contact holes 61 and 62.

In FIGS. 6D and 7D, a third metal layer, such as molybdenum, is formed on the above-mentioned intermediates, and then patterned to form the source electrode 72a and drain electrode 72b. Thus, the coplanar type TFT "T" of FIG. 5 is complete. Additionally, the data lines 71 of FIG. 5 are formed at the time when forming the source and drain electrodes 72a and 72b. As mentioned before, each data line 71 is substantially perpendicular to the gate lines 51 of FIG. 5. The source electrode 72a, as shown in FIG. 6D, contacts the source contact area 50a of active layer 50 through the first contact hole 61, while the drain electrode 72b contacts the drain contact area 50b of active layer 50 through the second contact hole 62.

Referring to FIG. 7D, although the third metal layer is formed on the shorting bar 54 and into the etching hole 64, this third metal layer is eliminated when forming the source and drain electrodes 72a and 72b. Moreover, a portion of the shorting bar 54 under the etching hole 64 is also removed during this patterning process. In other words, a portion of the double-layered shorting bar 54 (first and second metal layers) is removed during the etching process that forms the source and drain electrodes 72a and 72b to electrically disconnect the shorting bar 54. The reason for cutting the double-layered shorting bar 54 is to electrically isolate each gate line 51 of FIG. 5. Further, since the gate driving circuit "G" of FIG. 5 is electrically connected to the gate lines 51, the gate shorting bar 54 preventing the discharge of the static electricity is not required anymore.

Thereafter, a passivation layer 66 made of silicon nitride is formed on the interlayer insulator 60 filling the etching hole 64 and on the coplanar type TFT covering the source and drain electrodes 72a and 72b.

Now, referring to FIGS. 6E and 7E, a planar layer 80 that is formed of benzocyclobutene (BCB) is formed on an entire surface of the passivation layer 66 in order to planarize the array substrate. After that, portions of the planar layer 80 and passivation layer 66 over the drain electrode 72b are patterned to form the third contact hole 81 exposing a portion of the drain electrode 72b. Then, a transparent conductive material is formed on the planar layer 80 having the third contact hole 81, and then patterned to form the pixel electrode 91 in the pixel region. As a result, the pixel electrode 91 electrically contacts the drain electrode 72b through the third contact hole 81.

As aforementioned, the gate shorting bar is electrically cut when the source and drain electrodes are formed by patterning the third metal layer. When patterning the third metal layer, a wet-etching method is commonly used. However, since the gate shorting bar has a double-layered structure (first metal layer, e.g., aluminum, and second metal layer, e.g., molybdenum), an additional wet-etching process is required to electrically cut the gate shorting bar. In other words, since the second metal layer of the gate shorting bar is made of the same material as the third metal layer, it is etched when forming the source and gate electrodes. However, since the first metal layer is different from the second and third metal layers, the additional wet-etching process and etchant are necessary.

As a result, the substrate is introduced to the two different etchants, thereby causing defects in the substrate. Further, if the etching process time is reduced in order to prevent the defects, the gate shorting bar is not disconnected electrically, and thus proper operation of the LCD device can not be obtained.

SUMMARY OF THE INVENTION

Accordingly, the present invention is directed to an array substrate for a liquid crystal display and method for fabricating thereof that substantially obviates one or more of problems due to limitations and disadvantages of the related art.

An object of the present invention is to provide an array substrate for a liquid crystal display device having improved manufacturing method for forming a connecting line and a gate shorting bar.

Another object of the present invention is to provide a method of fabricating an array substrate for a liquid crystal display device with decreased defects to increase manufacturing yields.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the purpose of the present invention as embodied and broadly described, an array substrate for a liquid crystal display device, which has thin film transistors (TFTs), gate lines including even numbered gate lines and add numbered gate lines, gate pads, data lines and data pads on a substrate, comprises a first gate shorting bar disposed substantially perpendicular to the gate lines in a peripheral portion of the substrate; a second gate shorting bar spaced apart from and substantially parallel with the first gate shorting bar; a plurality of pixel electrodes, each pixel electrode contacting a respective one of the thin film transistors; and a connecting line connecting the first shorting bar to the even numbered gate lines and including a first line portion and a second line portion; wherein the first line portion is separated into two part; and wherein the second line portion has a neck shaped bridge portion at one time during a fabrication process and then separated into two parts.

In the inventive array substrate, the bridge portion has a width in the range of about 3.5 to about 4.5 micrometers, a length in the range of about 2 to about 8 micrometers and first and second slanting portions in a chevron pattern. The first slanting portion forms an angle in the range of about 20 to about 70 degrees and the second slanting portion forms an angle in the range of about 110 to about 160 degrees with a line parallel with the connecting line.

The said second line portion is separated into two parts by a distance of less than about 5 micrometers. The first line portion of the connecting line is formed of molybdenum (Mo). The second line portion of the connecting line includes at least aluminum (Al) or aluminum neodymium (AlNd).

The above-mentioned array substrate further comprises a gate insulation layer on the connecting line and a passivation layer on the thin film transistors. The plurality of pixel electrodes are formed of a transparent material selected from a group consisting of indium tin oxide and indium zinc oxide. Each thin film transistor includes a two-layered gate electrode.

In another aspect, a method of fabricating an array substrate for a liquid crystal display device, comprises forming a first metal layer on a substrate; forming a second metal layer on the first metal layer; patterning the first and second metal layers to form connecting lines including a bridge portion in the patterned second metal layer and to form a plurality of gate electrodes, gate lines, gate pads, shorting bars; forming a gate insulation layer on the substrate to cover the patterned first and second metal layers; forming an active layer and an ohmic contact layer over each gate electrode; removing a portion of the gate insulation layer disposed on the bridge portion and a portion of first layer of the connecting line under the bridge portion; forming a third metal layer on the gate insulation layer and on the bridge portion; patterning the third metal layer so as to form a plurality of source electrodes and drain electrodes; eliminating the bridge portions when patterning the third metal layer; and forming a passivation layer on the gate insulation layer, on the connecting line and on the patterned third metal layer.

The above-mentioned method of fabricating an array substrate further comprises the steps of patterning the passivation layer so as to form a plurality of drain contact holes; and forming a plurality of pixel electrodes that contacts the drain electrodes through the drain contact holes.

The plurality of pixel electrodes are formed of a transparent material selected from a group consisting of indium tin oxide and indium zinc oxide. The first metal layer includes at least aluminum or is aluminum neodymium. The second metal layer and third metal layer are molybdenum.

In the inventive method of fabricating an array substrate, each bridge portion has a width in the range of about 3.5 to about 4.5 micrometers and a length in the range of about 2 to abpit 8 micrometers. Each bridge portion has a neck shape including first and second slanting portions. The first slanting portion forms an angle in the range of about 20 to about 70 degrees with a line parallel with the connecting line. The second slanting portion forms an angle in the range of about 110 to about 160 degrees with a line parallel with the connecting line. The first layer of the connecting lines is separated into two parts by a distance of less than about 5 micrometers. Each gate electrode consists of two layers. The first layer of the gate electrode is aluminum and the second layer of the gate electrode is molybdenum.

In another aspect, a method of fabricating a liquid crystal display device includes forming a buffer layer on a substrate; forming a polycrystalline-silicon active layer on the buffer layer, the said active layer having an island shape; forming a gate insulation layer on the buffer layer to cover the polycrystalline-silicon active layer; forming a first metal layer on the gate insulation layer; forming a second metal layer on the first metal layer; patterning the first and second metal layer to form a gate electrode, a gate line and a gate shorting bar; forming a source contact area and a drain contact area at both sides of the polycrystalline-silicon active layer; forming an interlayer insulator on the gate insulation layer to cover the patterned first and second metal layers; patterning the interlayer insulator and the gate insulation layer so as to form a first contact hole to the source contact area and a second contact hole to the drain contact area, patterning a portion of the interlayer insulator on the gate shorting bar so as to form an etching hole, eliminating a portion of the first metal layer of the gate shorting bar under the etching hole, and forming an bridge portion in the second metal layer of the gate shorting bar under the etching hole; forming a third metal layer on the gate insulation layer and on the bridge portion; patterning the third metal layer so as to form a source electrode and a drain electrode, and removing the bridge portion when patterning the third metal layer; and forming a passivation layer on the interlayer insulator and on the patterned third metal layer.

The first metal layer is an aluminum layer having a thickness of about 3000 angstroms, the second metal layer is a molybdenum layer having a thickness of about 500 angstroms, and the third metal layer is a molybdenum layer having a thickness of about 500 angstroms. The interlayer insulator is made of silicon nitride and has a thickness of about 7000 angstroms. The bridge portion has a neck shape, and this neck-shaped bridge portion has a width of about 4 micrometers and a length in the range of about 2 to about 8 micrometers. The neck-shaped bridge portion also has a slanting portion which forms an angle in the range of about 20 to about 70 degrees with a line perpendicular to the gate shorting bar. The gate insulation layer is formed of an insulation material selected a group consisting of silicon nitride and silicon nitride.

The above-mentioned method of fabricating an array substrate further includes the steps of forming a planar layer on the passivation layer; pattering the planar layer and the passivation layer so as to form a drain contact hole to the drain electrode; forming the transparent conductive material on the planar layer; and patterning the transparent conductive material so as to form a pixel electrode contacting the drain electrode through the drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to illustrated embodiment of the present invention, examples of which are shown in the accompanying drawings. Wherever possible, the same reference numbers will be used throughout the drawings to refer to the same or like parts.

The principle of the present invention is employed in both an inverted staggered type TFT and a coplanar type TFT.

First, the inverted staggered type TFT will be explained. In the inverted staggered type TFT employing the principle of the present invention, a plan view and explanation thereof are omitted since a plan view of an inventive array substrate is somewhat similar to that of a conventional art shown in FIG. 3.

Figure 1:
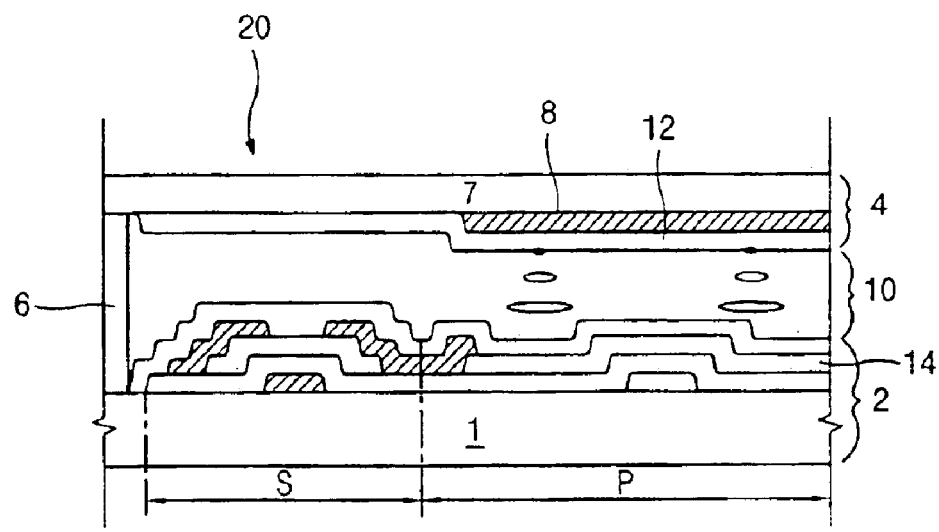
FIG. 1 is a schematic cross-sectional view illustrating a pixel of a conventional LCD panel in an active matrix LCD.
Figure 2:
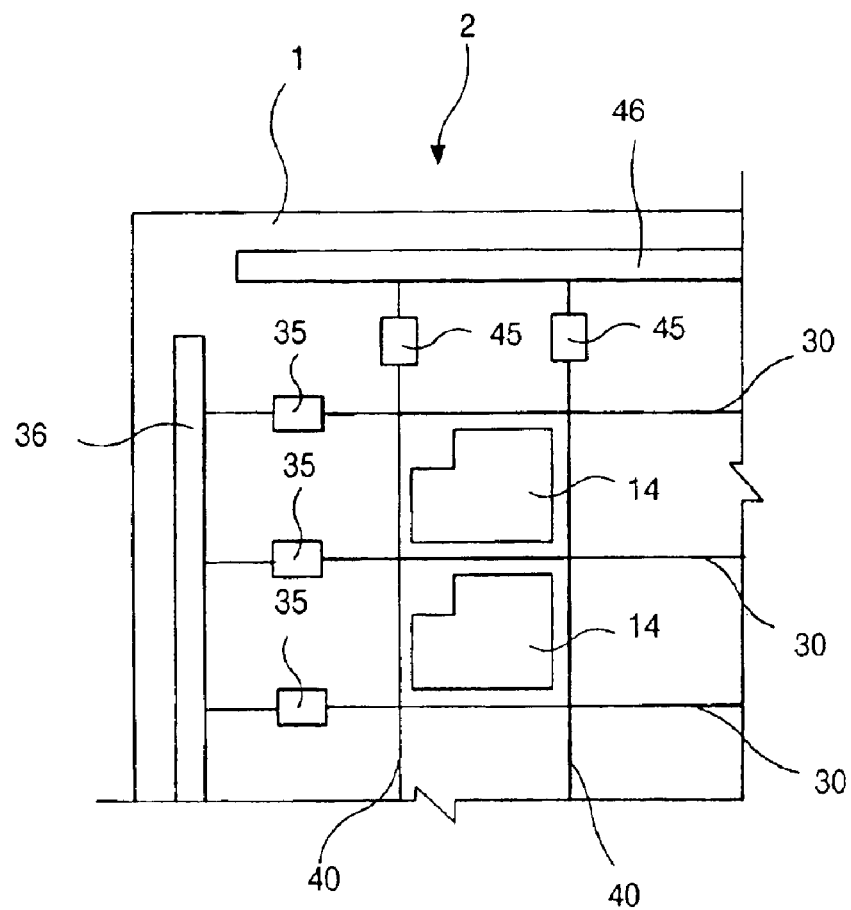
FIG. 2 is a schematic plan view illustrating a portion of an array substrate of FIG. 1.
Figure 3:
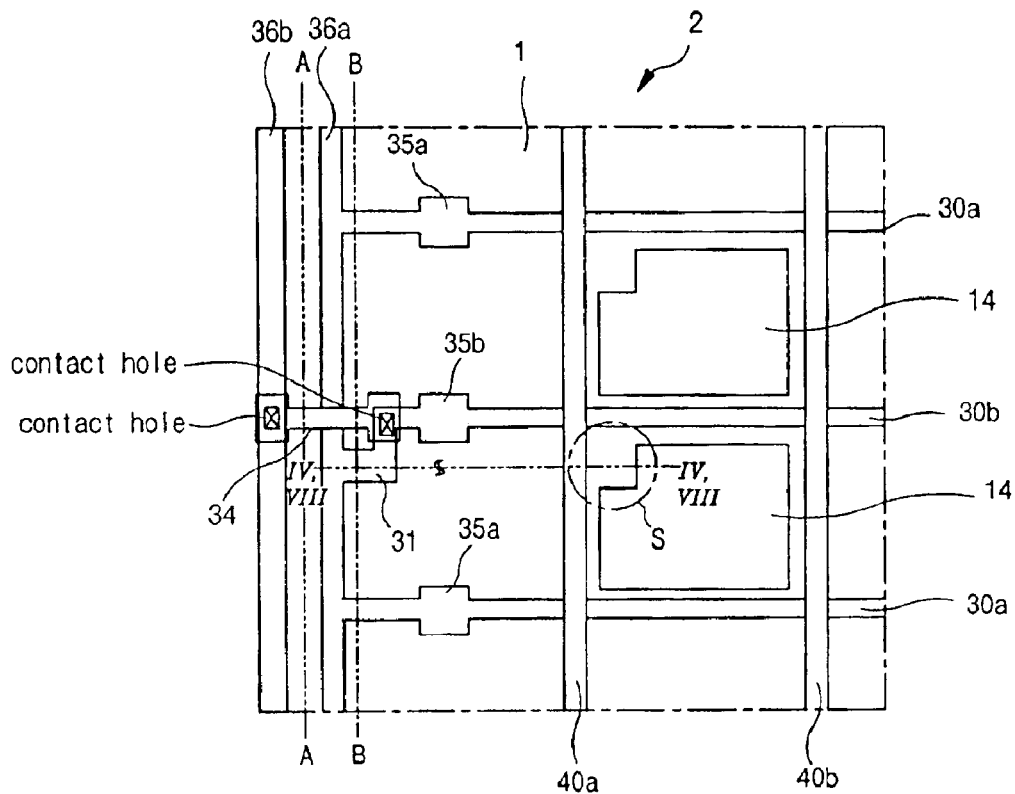
FIG. 3 is an enlarged plan view of FIG. 2 and illustrating an interconnection of shorting bars, gate pads and gate lines.
Figure 4A:
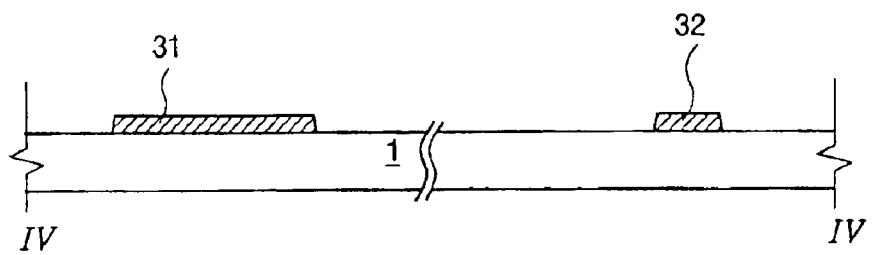
FIGS. 4A to 4E are cross-sectional views taken along line IV—IV of FIG. 3 and show conventional fabricating processes of an array substrate having TFT "S" of FIG. 3.
Figure 4B:
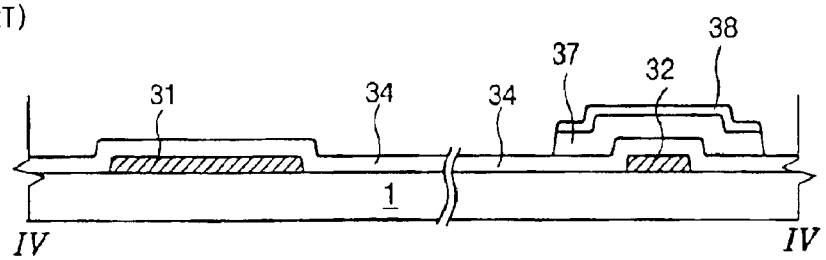
Figure 4C:
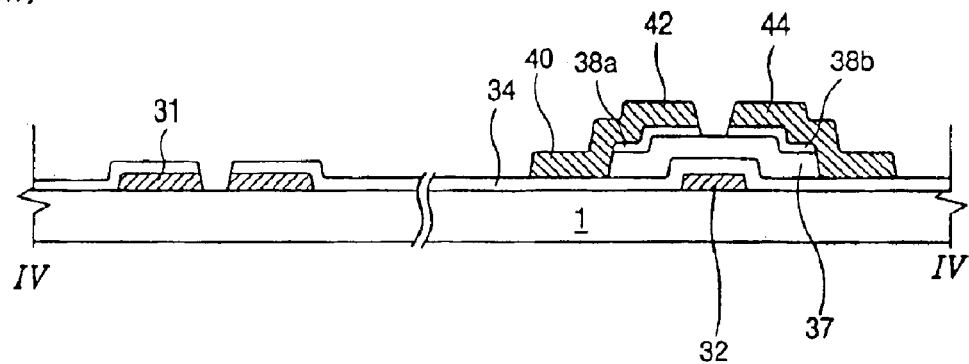
Figure 4D:
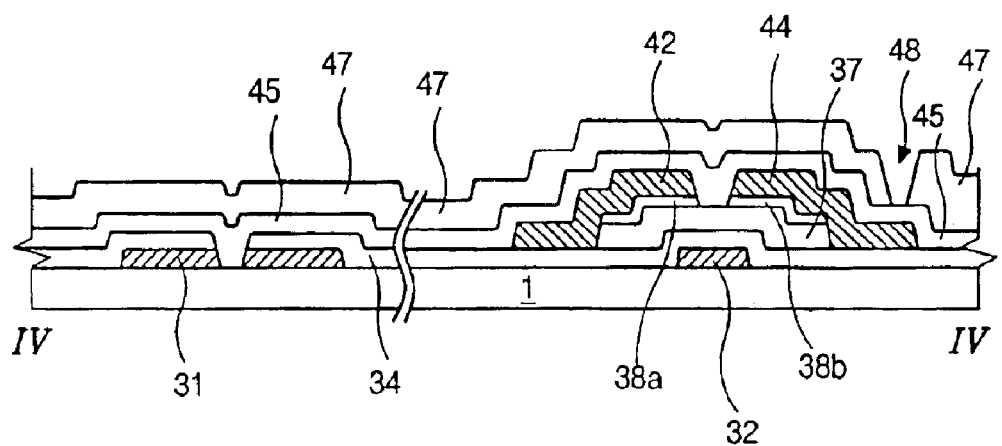
Figure 4E:
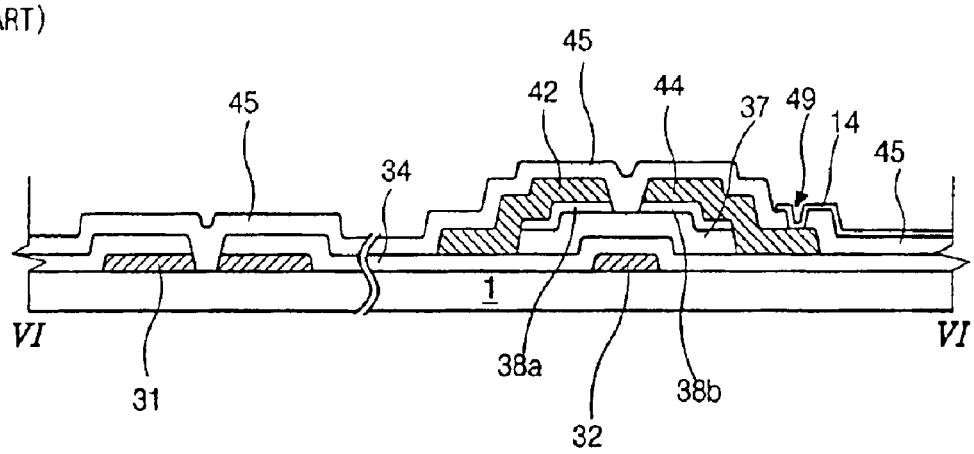
Figure 5:
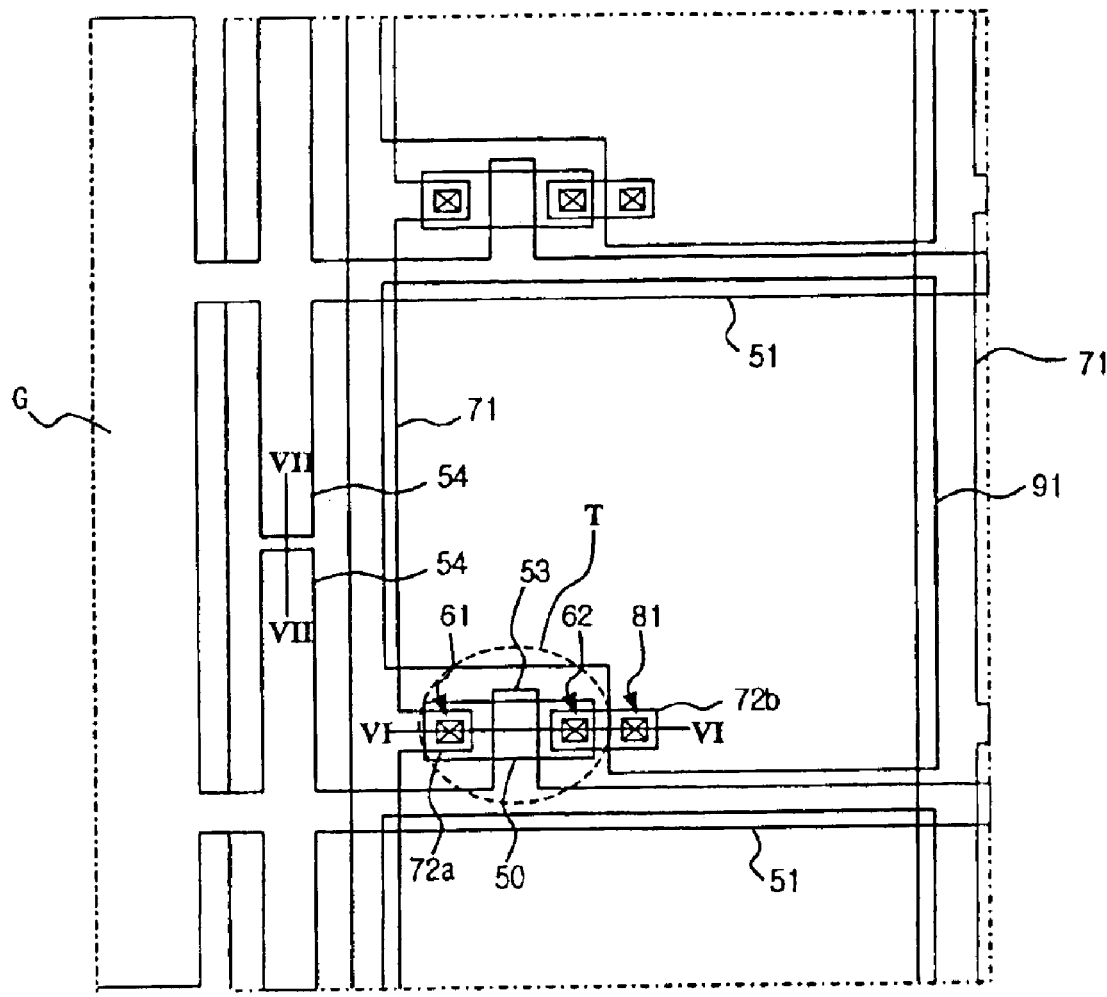
FIG. 5 is a schematic partial plan view of an array substrate having coplanar type TFTs.
Figure 6A:
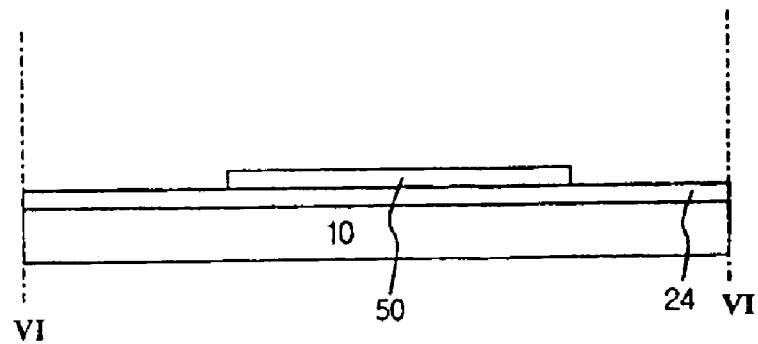
FIGS. 6A to 6E are cross-sectional views taken along the line VI—VI of FIG. 5.
Figure 6B:
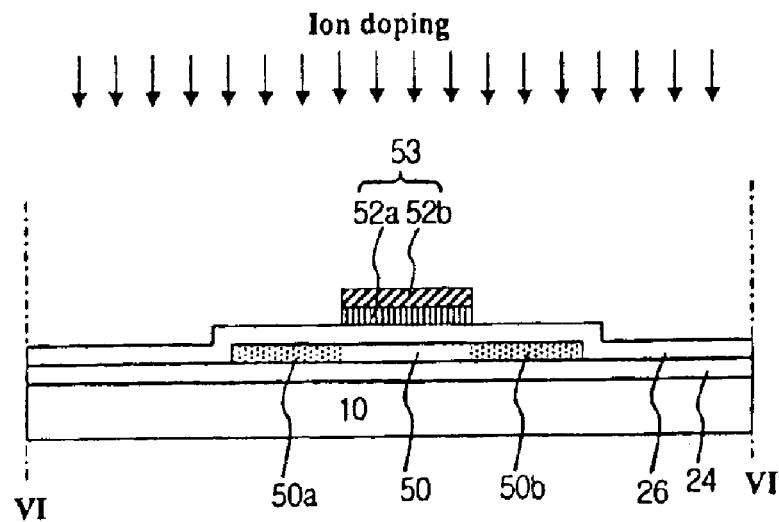
Figure 6C:
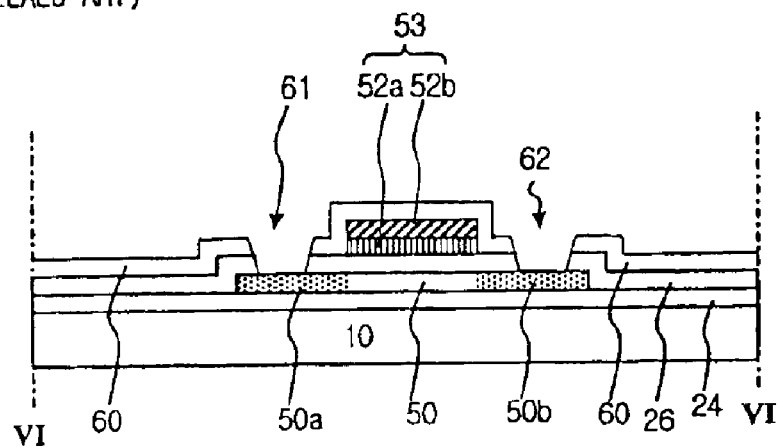
Figure 6D:
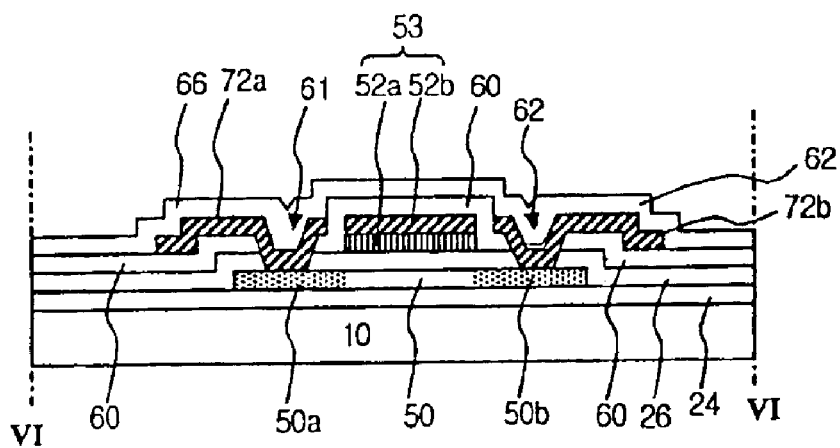
Figure 6E:
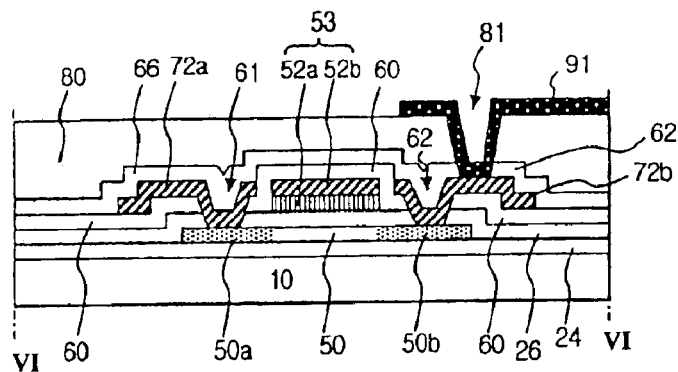
Figure 7A:
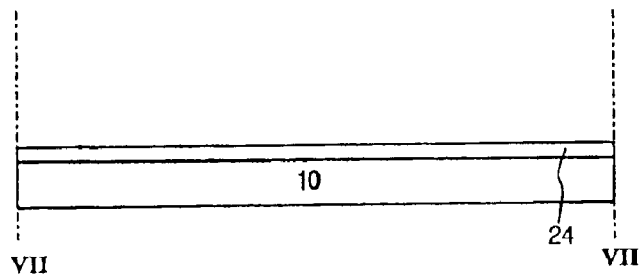
FIGS. 7A to 7E are cross-sectional views taken along the line VII—VII of FIG. 5.
Figure 7B:
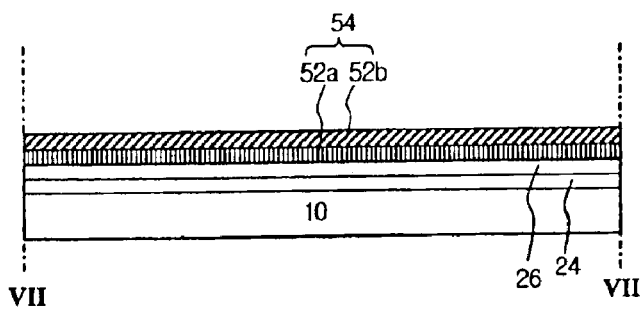
Figure 7C:
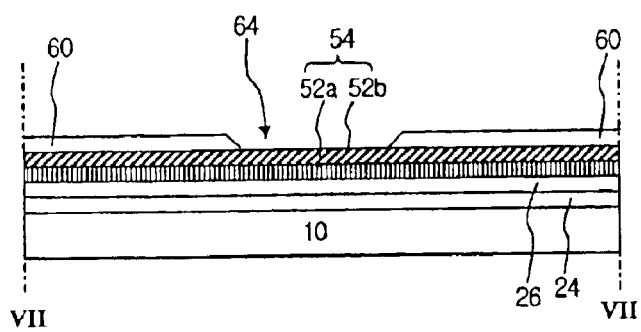
Figure 7D:
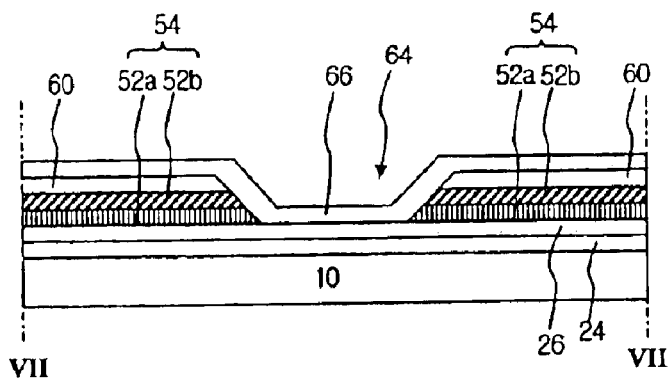
Figure 7E:
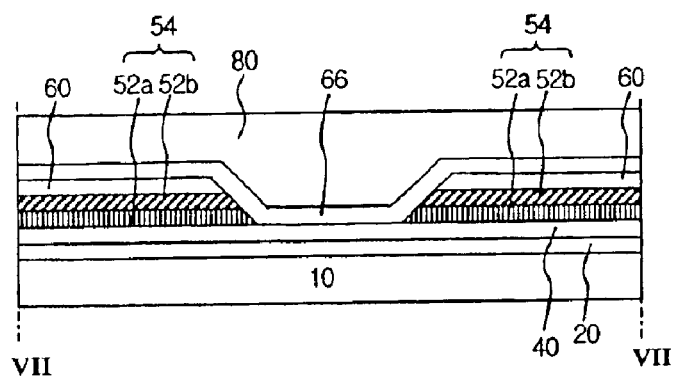

FIGS. 8A to 8F are cross-sectional views taken along line VIII—VIII of FIG. 3 and show inventive fabricating processes of an array substrate having TFT according to the present invention.

Figure 8A:
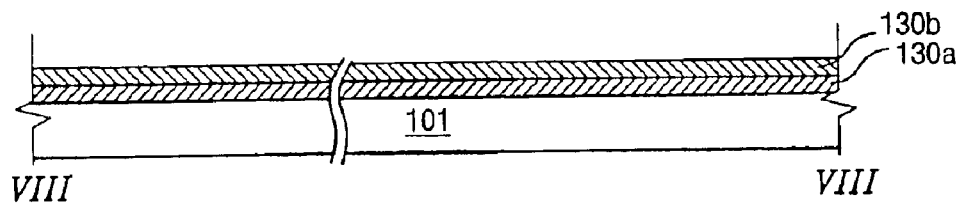
FIGS. 8A to 8F are cross-sectional views taken along line VIII—VIII of FIG. 3 and show inventive fabricating processes of an array substrate having TFT according to the present invention.

Referring to FIG. 8A, a first metal layer 130a is formed on a transparent substrate 101. This first metal layer 130a includes at least aluminum (Al) such that it can be a pure aluminum layer or an aluminum neodymium alloy (AlNd) layer, thereby preventing a signal delay and a cross-talk caused by the signal delay. Thus, an image quality is improved in the LCD devices. Thereafter, a molybdenum (Mo) layer 130b (i.e., a second metal layer) is formed on the first metal layer 130a in order to prevent the first metal layer 130a from corroding during an acidic process. Further, this molybdenum (Mo) layer prevents formation of hillocks during high temperature processing.

Figure 8B:
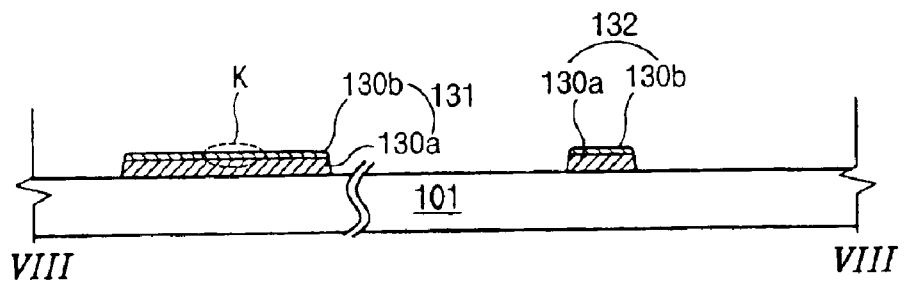

In FIG. 8B, after forming the first and second metal layers 130a and 130b in series on the transparent substrate 101, a positive photo resist (not shown) is deposited on the second metal layer 130b, and then exposed to light using a first mask (not shown). Thereafter, the first and second metal layers 130a and 130b are patterned into a desired shape using etchants. From this etching process, a first connecting line 131 and a gate electrode 132, which have double-layered structures, are formed on the transparent substrate 101. Namely, the first connecting line 131 includes the first and second metal layers 130a and 130b, and the gate electrode 132 also includes the first and second layers 130a and 130b.

At the time when forming the first connecting line 131 and gate electrode 132, the gate shorting bars (see FIG. 3) are formed together. Further, the gate lines and pads (in FIG. 3) are formed together with the gate electrode 132. Additionally, the data shorting bars and data pads can be formed at the time when forming the gate electrode 132.

Figure 9:
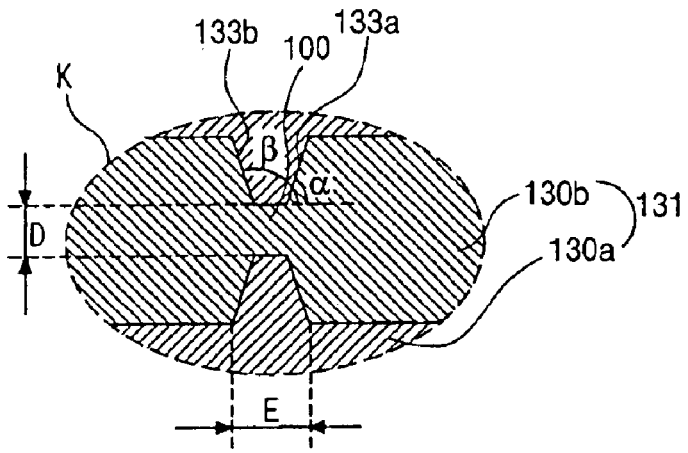
FIG. 9 is an enlarged plan view of a portion "K" of FIG. 8B.

Now referring to FIG. 9 that is an enlarged plan view of a portion "K" of FIG. 8B, the second metal layer 130b of the first connecting line 131 has a neck-shaped "bridge" 100 in its central portion. The bridge 100 may be formed of Molybdenum. For the purposes of explanation, a molybdenum bridge ("Mo-Bridge") is described herein. This Mo-Bridge 100 has a width "D" in the range of 3.5 to 4.5 micrometers ($\mu$m) and a length "E" of several micrometers or several tens of micrometers. Beneficially, the length of the Mo-Bridge 100 ranges from 2 to 8 micrometers ($\mu$m). Further, first and second slanting portions 133a and 133b of the Mo-Bridge 100 form angles "$\alpha$" and "$\beta$" with a line parallel with the first connecting line 131, respectively. The first angle "$\alpha$" ranges from 20 to 70 degrees, and the second angle "$\beta$" is ranges from 110 to 160 degrees. Although FIG. 9 shows Mo-bridge 100, the first metal layer 130a of the first connecting line can also have a bridge shape like the Mo-bridge 100 formed of another suitable material.

Figure 8C:
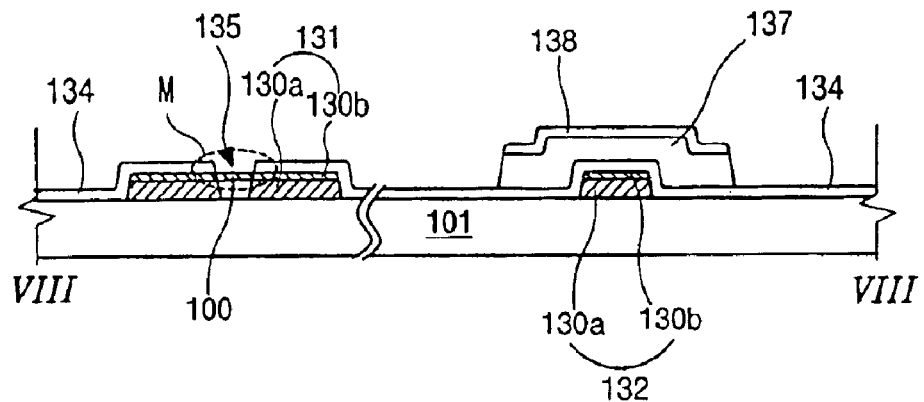

Now, referring to FIG. 8C, a gate insulation layer 134, which is silicon nitride ($SiN_x$) or silicon oxide ($SiO_x$), is formed on an entire surface of the transparent substrate 101 and covers the patterned first and second metal layers 130a and 130b. Then, an active layer 137 (i.e., a pure amorphous silicon (a-Si:H) layer) and an ohmic contact layer 138 (i.e., a doped amorphous silicon ($n^+$ a-Si:H) layer) are formed together upon the gate insulation layer 134, especially over the gate electrode 132. Thereafter, a portion of the gate insulation layer 134 on the Mo-bridge 100 is eliminated to form a first etching hole 135.

Figure 10A:
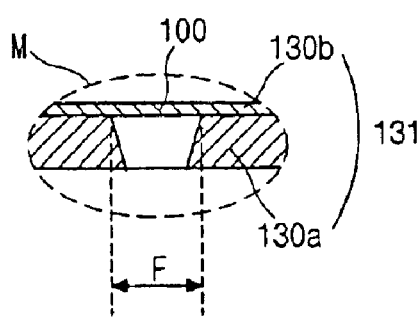
FIG. 10A is an enlarged cross-sectional view of a portion "M" of FIG. 8C.
Figure 10B:
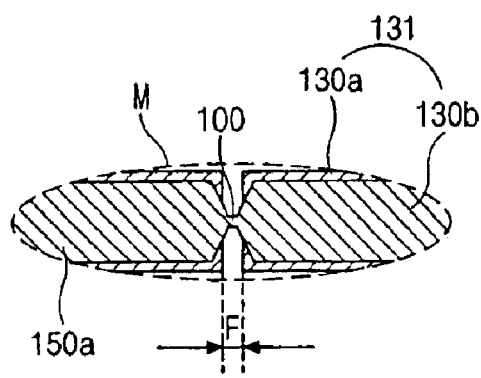
FIG. 10B is an enlarged plan view of the portion "M" of FIG. 8C.

FIG. 10A is an enlarged cross-sectional view of a portion "M" of FIG. 8C, and FIG. 10B is an enlarged plan view of the portion "M" of FIG. 8C. When patterning the portion of the gate insulation layer 134 on the Mo-bridge to form the first etching hole 135, the center of the first metal layer 130a disposed under the Mo-Bridge 100 is removed, thereby separating the first metal layer 130a of the first connecting line 131 into two parts. The portion of the gate insulation layer 134 is etched using a wet-etching method. Since the first metal layer 130a comprises aluminum, which is chemically weak in acidic process, i.e., does not have anticorrosion, the portion of the first metal layer 130a under the Mo-Bridge 100 is eliminated by the etchant during the wet-etching process of the gate insulation layer 134.

As shown in FIGS. 10A and 10B, a distance "F" between the two separated parts of the first metal layer 130a is several micrometers or several tens of micrometers, advisably less than 5 micrometers ($\mu$m). Although the first metal layer 130a is electrically separated, the Mo-Bridge 100 electrically connects the two separated parts, thereby preventing the discharge of the static electricity occurring in a later step. In the present invention, the first connecting line 131 has a chevron pattern, and this chevron pattern can also be employed in a line connecting the data shorting bar to the data pads.

Figure 8D:
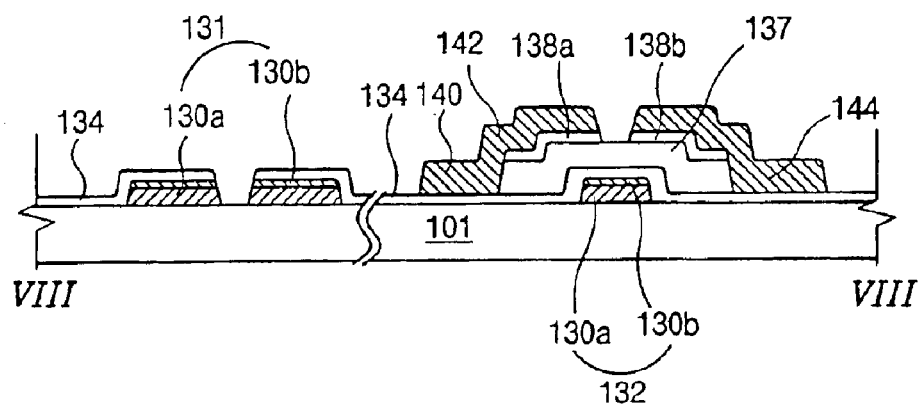

In FIG. 8D, a third metal layer, which is molybdenum (Mo), is then formed upon an entire surface of the gate insulation layer 134 to cover the active layer 137 and ohmic contact layer 138. Thereafter, a positive photo resist is formed on the third metal layer, exposed using a mask, and then developed in a desired pattern. The third metal layer is then etched using an etchant, thereby forming a source electrode 142 and a drain electrode 144. At this time, the Mo-Bridge 100 of FIG. 8C is removed because this Mo-Bridge 100 is formed of the same material as the third metal layer. Thus, the first connecting line 131 is electrically cut off. The source and drain electrodes 142 and 144 are spaced apart from each other and overlap opposite ends of the gate electrode 132. The data line 140 is also formed with the source and drain electrodes 142 and 144. Thereafter, a portion of the ohmic contact layer 138 disposed upon the active layer 137 is etched using the source and drain electrodes 142 and 144 as masks, thereby forming first and second ohmic contact layers 138a and 138b and a channel region in an interval between the source electrode 142 and the drain electrode 144. Here, the source electrode 142 contacts the first ohmic contact layer 138a, and the drain electrode 144 contacts the second ohmic contact layer 138b. Therefore, the TFT "S" of FIG. 3 including the gate electrode 132, the active layer 137, the first and second ohmic contact layers 138a and 138b, and the source and drain electrodes 142 and 144 is complete.

Figure 8E:
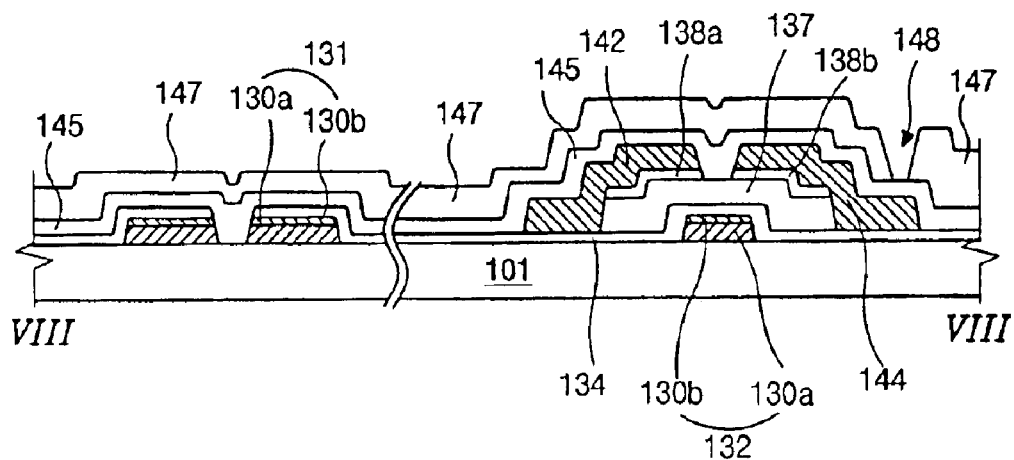
Figure 8F:
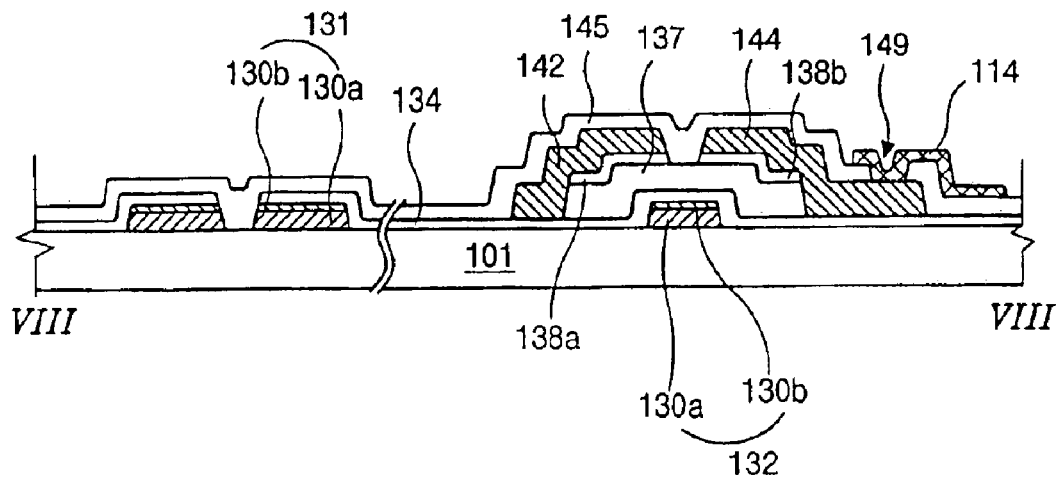

Now referring to FIG. 8E, a passivation layer 145 is formed on and over an entire surface of the transparent substrate 101 in order to cover the TFT, the first connecting line 131 and gate insulation layer 134. The passivation layer 145 is silicon nitride ($SiN_x$), silicon oxide ($SiO_x$) or benzocyclobutene (BCB). Then, a photo resist 147 is formed on the passivation layer 145 by a spin coat method, and then exposed to light using a mask. Thereafter, the photo resist 147 is developed to form a second etching hole 148 over the drain electrode 144. After forming the etching hole 148, the array substrate is put into an etching chamber in order to form a drain contact hole 149 of FIG. 8F. Namely, a portion of the passivation layer 145 on the drain electrode 144, as shown in FIG. 8F, is removed to form the drain contact hole 149 of FIG. 8F. Thereafter, the photo resist 147 on the passivation layer 145 is completely eliminated.

Referring to FIG. 8F, a transparent conductive material including at least indium-tin-oxide (ITO) or indium-zinc-oxide (IZO) is deposited and patterned to form a pixel electrode 114 that connects with the drain electrode 144 through the drain contact hole 149.

As previously described, the first slanting portion 133a of the Mo-Bridge 100 forms an angle α in the range of about 20 to 70 degrees with a line parallel with the first connecting line 131, and the second slanting portion 133b of the Mo-Bridge 100 forms an angle β in the range of about 110 to 160 degrees. The length of the Mo-Bridge 100 is several micrometers or several tens of micrometers, advisably substantially equal to or more than 2 micrometers to substantially equal to or less than 8 micrometers ($2 \leq length \leq 8$). The distance of the separated two parts of the connecting line 131, disposed under the Mo-Bridge 100, is also several micrometers or several tens of micrometers, advisably less than about 5 micrometers. Furthermore, the Mo-Bridge 100 is electrically cut off when the source and drain electrodes 142 and 144 are formed. Therefore, an additional etching process and etchant are not required when cutting the first connecting line. Additionally, when the Mo-Bridge 100 has a length of several micrometers, the Mo-Bridge 100 does not separate from the aluminum layer 130a, and does not easily break down by the physical impact in the manufacturing process. As a result, the manufacturing yield of the array substrate increases.

Furthermore, since the width of the Mo-Bridge 100 ranges from about 3.5 to about 4.5 micrometers, the Mo-Bridge 100 can easily be eliminated by the etchant when forming the source and drain electrodes 142 and 144. Thus, testing of the TFT "S" is performed without any defects.

The above-mentioned bridge structure can be adapted to the coplanar type TFT. Now, referring to FIGS. 11–14B, the array substrate including the coplanar type TFT and employing the above-mentioned bridge structure will be explained.

Polycrystalline silicon (poly-Si) is widely used as an active layer for the TFT in an inventive array substrate. That is because it is easy to obtain fast response time in display when using the polycrystalline silicon layer as an element of the TFT, rather than when using the amorphous silicon (a-Si) as an element of the TFT. Namely, as described before, field effect mobility in poly-Si is 100 to 200 times faster than that in a-Si. Additionally, poly-Si has a good stability against the light and temperature variation.

Figure 11:
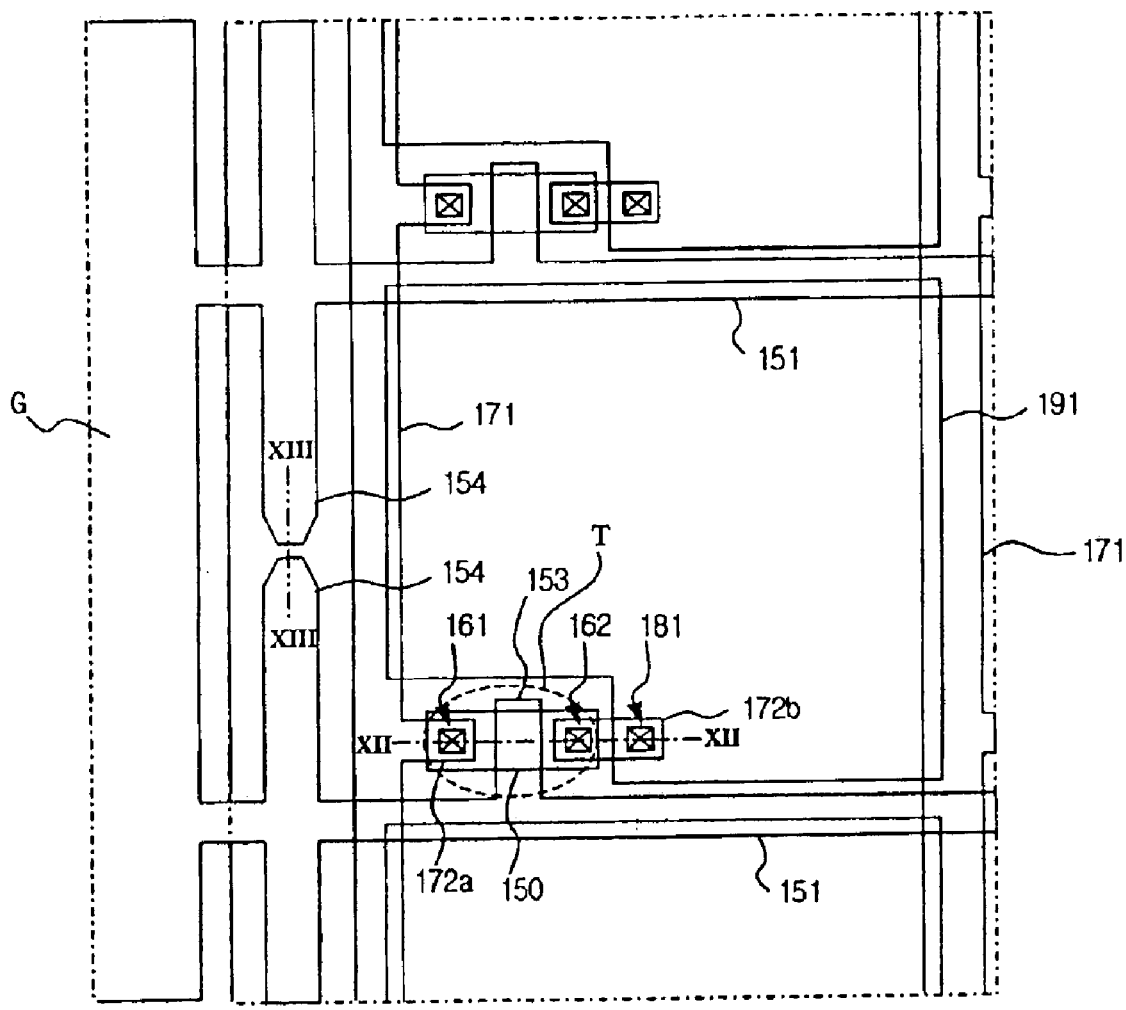
FIG. 11 is a schematic partial plan view of an array substrate having coplanar type TFTs according to a principle of the present invention.

FIG. 11 is a schematic partial plan view of an array substrate having coplanar type TFTs according to a principle of the present invention; FIGS. 12A to 12E are cross-sectional views taken along the line XII—XII of FIG. 11; and FIGS. 13A to 13E are cross-sectional views taken along the line XIII—XIII of FIG. 11.

Referring to FIG. 11, gate lines 151 are arranged transversely and data lines 171 are arranged in a longitudinal direction substantially perpendicular to the gate lines 151. The gate lines 151 and data lines 171 define pixel regions, and each pixel electrode 191 is positioned in a respective pixel region. Although the pixel electrodes 191 overlap the gate lines 151 and data lines 171 in the exemplary plan view of FIG. 11, it is not required that the pixel electrodes 191 overlap the gate and data lines 151 and 171, if not necessary. At one corner of each pixel region, a coplanar type TFT "T" is positioned near the crossover point of each gate line 151 and data line 171. At the ends of the gate lines 151, a gate driving circuit "G" is electrically connected to all gate lines 151. Further, all of the data lines 171 are also electrically connected to a data driving circuit (not shown) at the ends of the data lines 171. A gate shorting bar 154 is disposed substantially parallel with the data lines 171 at the peripheral portion of the substrate. Also, a data shorting bar (not shown) is disposed substantially parallel with the gate lines 151 at another adjacent peripheral portion of the substrate. As shown in FIG. 11, the gate shorting bar 154 is electrically disconnected by the way of employing the above-mentioned bridge structure.

In the coplanar type TFT "T" of FIG. 11, a gate electrode 153 extending from the gate line 151 is disposed over an active layer 150 including polycrystalline silicon. A source electrode 172a extending from the data line 171 contacts the active layer 150 through a first contact hole 161, and a drain electrode 172b positioned opposite to the source electrode 172a contacts the active layer 150 through a second contact hole 162. Further, a portion of the pixel electrode 191 contacts the drain electrode 172b through a third contact hole 181.

The fabrication processes will be explained in accordance with FIGS. 12A–12E and 13A–13E. FIGS. 12A to 12E show the fabrication process steps of the TFT "T" of FIG. 11, and FIGS. 13A to 13E show the fabrication process steps of the shorting bar of FIG. 11, respectively corresponding to FIGS. 12A to 12E.

Figure 12A:
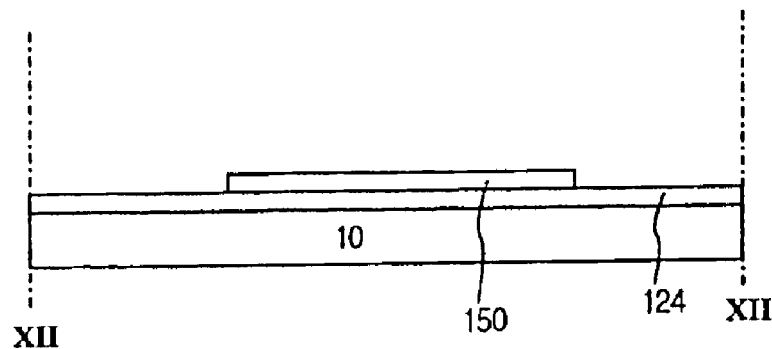
FIGS. 12A to 12E are cross-sectional views taken along the line XII—XII of FIG. 11.
Figure 13A:
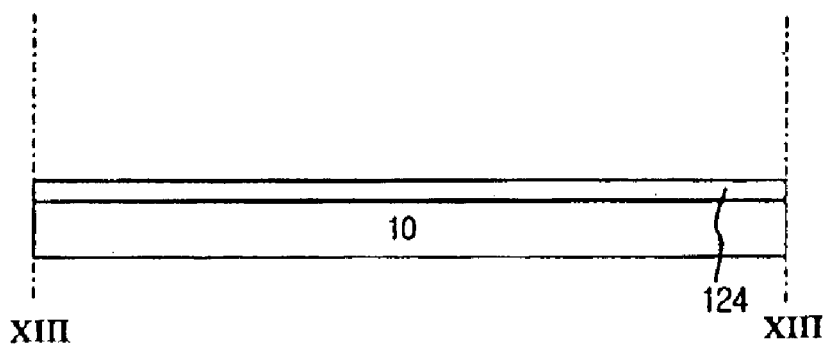
FIGS. 13A to 13E are cross-sectional views taken along the line XIII—XIII of FIG. 1.

Referring to FIGS. 12A and 13A, a buffer layer 124 is formed on a transparent substrate 110, and then the active layer 150 (i.e., polycrystalline silicon) having an island shape is formed on the buffer layer 124. Therefore, the buffer layer 124 and the active layer 150 are stacked in an area for the TFT, while only the buffer layer 124 is stacked in an area for the shorting bar 154 of FIG. 11. Here, the buffer layer 124 is formed for preventing alkali ions, such as $K^+$ or/and $Na^+$, from diffusing into the active layer 150. Namely, when crystallizing amorphous silicon into polycrystalline silicon, the alkali ions diffuse from the substrate 10 to the active layer 150. Therefore, the buffer layer 124 is required to prevent the diffusion of alkali ions. In order to form the island-shaped polycrystalline silicon layer 154 on the buffer layer 124, a method directly depositing polycrystalline silicon on the buffer layer 124 is used or a method crystallizing amorphous silicon into polycrystalline silicon is employed.

Methods for forming polycrystalline silicon using amorphous silicon include solid phase crystallization (SPC), an excimer laser crystallization (ELC) and a metal induced crystallization (MIC). Generally, in order to form a polycrystalline silicon, amorphous silicon is deposited using a Plasma Chemical Vapor Deposition (PCVD) or Low Pressure Chemical Vapor Deposition (LPCVD) method, and then the amorphous silicon is crystallized.

Firstly, a metal induced crystallization (MIC) technique is to deposit metallic material on the amorphous silicon. The MIC can use a large size glass substrate, since the metallic material can lower the crystallization temperature.

Secondly, a solid phase crystallization (SPC) technique is to change amorphous silicon into polycrystalline silicon by heat-treatment at a high temperature for a long time in a furnace. It requires forming a buffer layer on a quartz substrate having the thermal endurance over temperatures of about 600 degrees Celsius (° C.) in order to prevent the quartz substrate from diffusing the impurity material. The amorphous silicon layer is deposited on the buffer layer and introduced by the heat-treatment.

Thirdly, an excimer laser crystallization (ELC) technique is to grow polycrystalline silicon using laser irradiation while heating the substrate having amorphous silicon up to temperatures of approximately 250 degrees Celsius (° C).

Figure 12B:
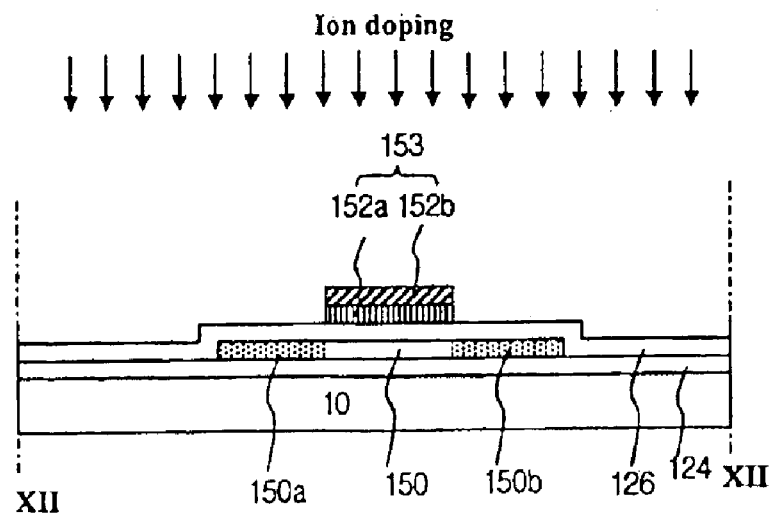
Figure 13B:
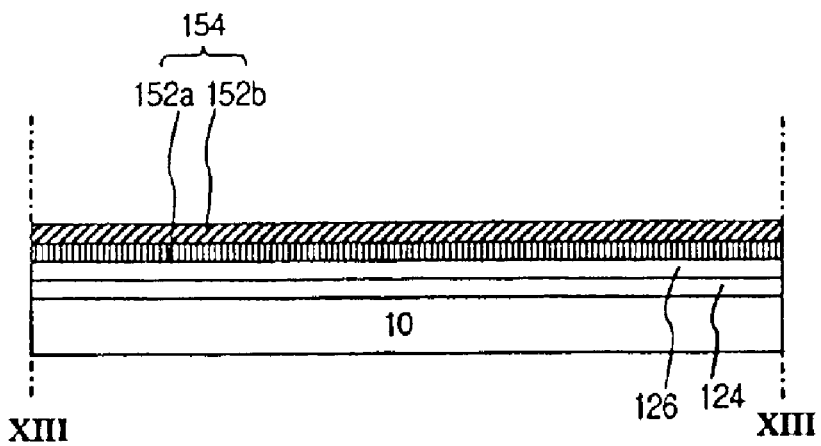

In FIGS. 12B and 13B, a gate insulation layer 126 that is made from silicon nitride or silicon oxide is formed on an entire surface of the buffer layer 124 to cover the active layer 150. At this time, the gate insulation layer 126 has a thickness of about 1800 angstroms (Å) and is made of silicon nitride or silicon oxide. Thereafter, a first metal layer 152a and a second metal layer 152b are formed in series on the gate insulation layer 126. The first metal layer 152a is usually a metallic material having a low resistance, such as pure aluminum or aluminum alloy (e.g., aluminum neodymium (AlNd)), and has a thickness of about 3000 angstroms (Å). The second metal layer 152b is usually a metallic material having high corrosion resistance and durability, such as molybdenum (Mo), and has a thickness of about 500 angstroms (Å). Thus, the second metal layer 152b protects the first metal layer 152a and prevents the formation of hillocks. Then, the first and second metal layers 152a and 152b are patterned together in order to form the gate electrode 153 over the active layer 150, the shorting bar 154 in a periphery of the substrate (see FIG. 11), and the gate lines 151 of FIG. 11. All the elements made of the first and second metal layers 152a and 152b have the double-layered structure as shown in FIGS. 12B and 13B.

Still, referring to FIGS. 12B and 13B, after patterning the first and second layers 152a and 152b, an ion doping process is performed to the active layer 150 using the gate electrode 153 as a mask. Namely, the active layer 150 is introduced by $n^+$(or $p^+$) ion doping (e.g., plasma doping) using the gate electrode 153 as a mask, and thus a source contact area 150a and a drain contact area 150b are formed at both sides of the active layer 150. At this time, the gate electrode 153 acts as an ion-stopper that prevents the dopant ($n^+$ or $p^+$ ion) from penetrating into a portion of polycrystalline silicon (the active layer 150) under the gate electrode 153. Therefore, the portion of active layer 150 under the gate electrode 153 remains as a pure silicon area, while the source and drain contact areas 150a and 150b doped by the dopant become impure silicon areas. These source and drain contact areas 150a and 150b drop the contact resistance between the active layer 150 and the later formed source/drain electrodes.

Figure 12C:
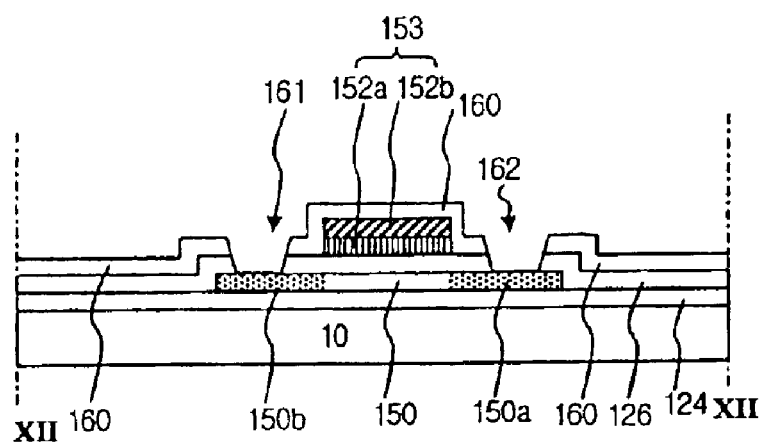
Figure 13C:
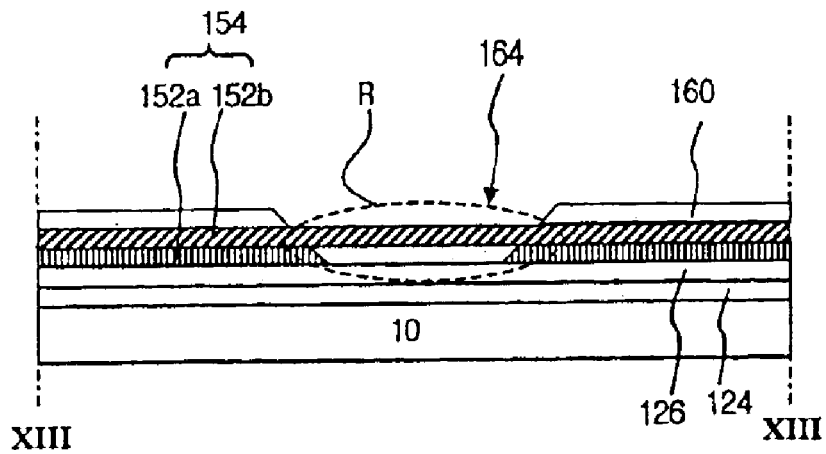

Now, referring to FIGS. 12C and 13C, an interlayer insulator 160, which is made of silicon nitride or silicon oxide and has a thickness of about 7000 angstroms (Å), is formed on the gate insulation layer 126 to cover the patterned first and second metal layer 152a and 152b. Thereafter, the first contact hole 161 to the source contact area 150a and the second contact hole 162 to the drain contact area 150b are formed by patterning both the interlayer insulator 160 and the gate insulation layer 126. At this time, an etching hole 164 to the shorting bar 154 is formed with the contact holes 161 and 162.

Furthermore, when forming these holes 161, 162 and 164, a portion of the first metal layer 152a under the etching hole 164 is also etched to cut and separate the first metal layer 152a. The interlayer insulator 160 and the gate insulation layer 126 become etched using a wet-etching method to form the first and second contact holes 161 and 162 and etching hole 164. As mentioned before, the layer including aluminum (the first metal layer 152a) is weak and sensitive to the etchant compared to the layer including molybdenum (the second metal layer 152b). Namely, the first metal layer 152a is chemically weak in an acidic process, especially, for a first metal layer 152a having a thickness of about 3000 angstroms (Å). As a result, the first metal layer 152a under the etching hole 164 is eliminated and separated into two parts during the wet-etching process.

Figure 13D:
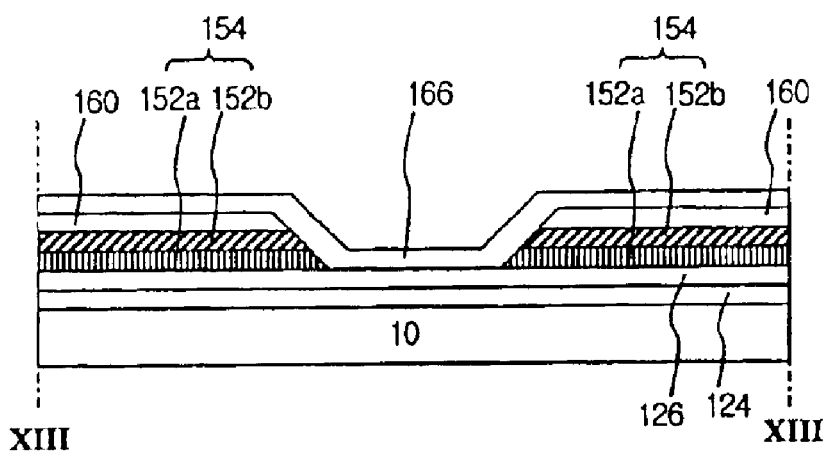
Figure 13E:
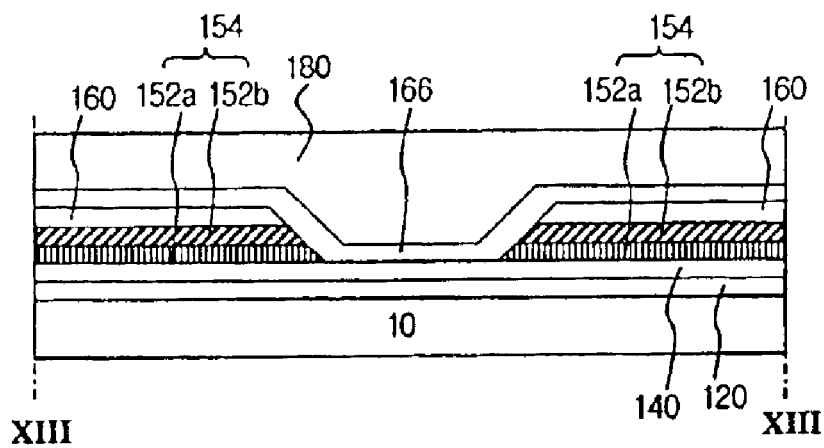
Figure 14A:
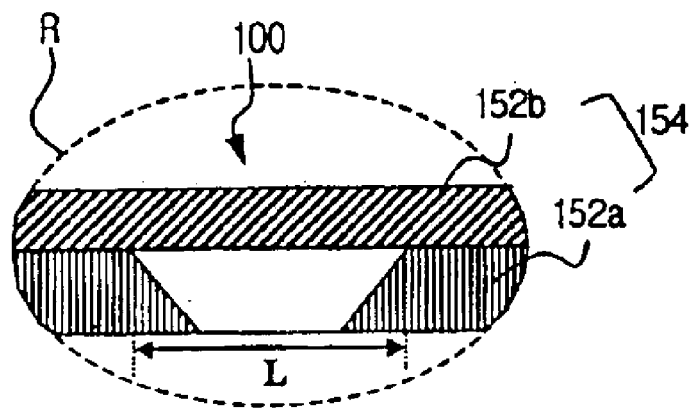
FIG. 14A is an enlarged cross-sectional view of a portion "R" of FIG. 13C.
Figure 14B:
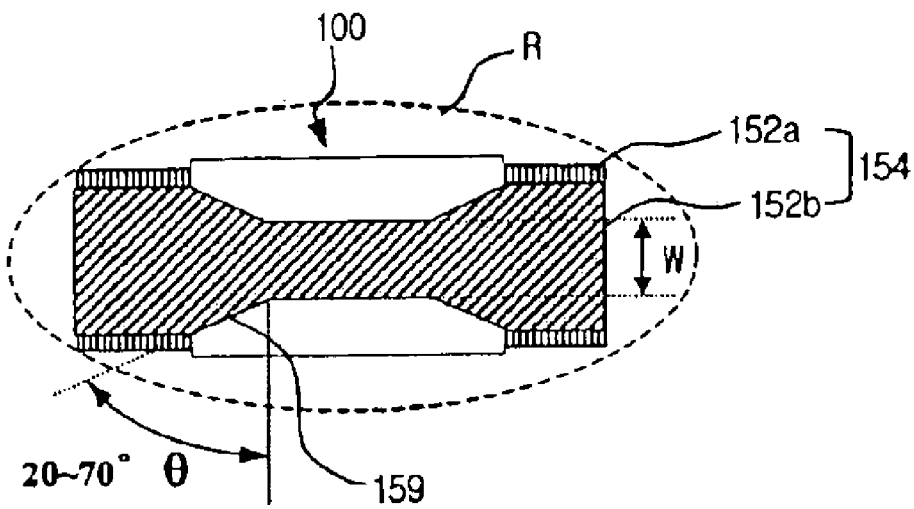
FIG. 14B is an enlarged plan view of the portion "R" of FIG. 13C.

Referring to FIGS. 14 and 15 the above-mentioned etching process will be explained in detail. FIG. 14A is an enlarged cross-sectional view of a portion "R" of FIG. 13C, and FIG. 14B is an enlarged plan view of the portion "R" of FIG. 13C. When patterning the portion of the interlayer insulator 160 and gate insulation layer 126 to form the first and second contact holes 161 and 162 and the etching hole 164, the center of the first metal layer 152a disposed under the etching hole 164 is removed, thereby separating the first metal layer 152a of the gate shorting bar 154 into two parts. Further, the second metal layer 152b of the gate shorting bar 154 has a bridge 100 having a neck shape because the second metal layer 152b is also slightly etched by the etchant that etches the interlayer insulator 160 and gate insulation layer 126 in the wet etch process. In the exampled shown in FIGS. 13A–E and FIGS. 14A–B, the bridge is formed of molybdenum ("Mo-Bridge"). The shape of the Mo-Bridge 100 is determined by the supplying time and the density of etchant. Further, since the second metal layer 152b of the gate shorting bar 154 has a thickness of about 500 angstroms (Å), the Mo-Bridge 100 is easily cut in a later step.

As shown in FIGS. 14A and 14B, a distance "L" between the two separated parts is several micrometers or several tens of micrometers, advisably less than approximately 5 micrometers ($\mu$m) in order to prevent the break down of the Mo-Bridge 100. Although the first metal layer 152a is electrically separated, the Mo-Bridge 100 electrically connects the two separated parts, thereby preventing the discharge of the static electricity occurring in a later step. As mentioned before referring to FIG. 9, the bridge 100 has a width "W" in the range of about 3.5 to about 4.5 micrometers ($\mu$m). Further, a slanting portion 159 of the bridge 100 forms an angle θ in the range of 20 to 70 degrees with a line substantially perpendicular to the gate shorting bar 154.

Figure 12D:
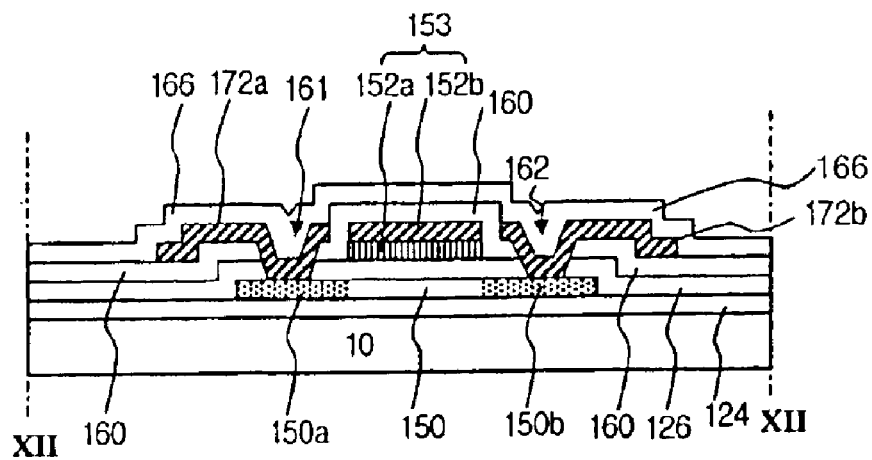

In FIGS. 12D and 13D, a third metal layer, such as molybdenum, is formed on the above-mentioned intermediate layers, and then patterned to form the source electrode 172a and drain electrode 172b. Thus, the coplanar type TFT "T" of FIG. 11 is complete. Additionally, the data lines 171 of FIG. 11 are formed at the time when forming the source and drain electrodes 172a and 172b. As mentioned before, each data line 171 is substantially perpendicular to the gate lines 151 of FIG. 11. The source electrode 172a, as shown in FIG. 12D, contacts the source contact area 150a of active layer 150 through the first contact hole 161, while the drain electrode 172b contacts the drain contact area 150b of active layer 150 through the second contact hole 162.

Referring to FIG. 13D, although the third metal layer is formed on the gate shorting bar 154 and in the etching hole 164, this third metal layer is eliminated when forming the source and drain electrodes 172a and 172b. Moreover, a portion of the gate shorting bar 154 under the etching hole 164 is also simultaneously removed during this patterning process. In other words, the double-layered shorting bar 154 (first and second metal layers) is disconnected owing to the etching process that forms the source and drain electrodes 172a and 172b. As mentioned before, since the second metal layer 152b has a thickness of about 500 angstroms (Å) and the Mo-Bridge 100 has a neck shape under the etching hole 164, the gate shorting bar 154 is easily separated into two parts by the etchant when patterning the third metal layer. Further, since the Mo-Bridge 100 has a width "W" of about 4 micrometers ($\mu$m), electrically cutting the gate shorting bar 154 is more reliable. The reason for cutting the double-layered shorting bar 154 is to electrically isolate each gate line 151 of FIG. 11. Further, since the gate driving circuit "G" of FIG. 11 is electrically connected to the gate lines 151, the gate shorting bar 154 is not required to prevent the discharge of the static electricity.

Thereafter, a passivation layer 166 made of silicon nitride is formed on the interlayer insulator 160 filling the etching hole 164 and on the coplanar type TFT and covering the source and drain electrodes 172a and 172b.

Figure 12E:
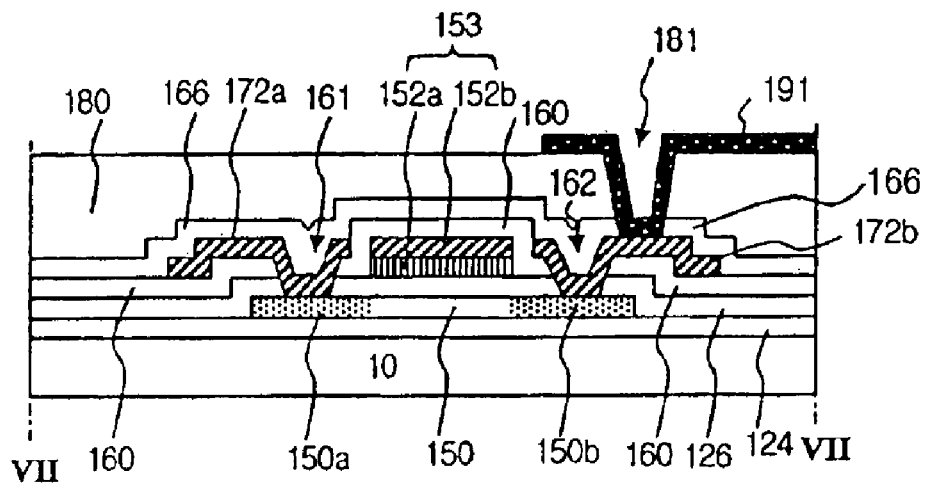

Now, referring to FIGS. 12E and 13E, a planar layer 180 that is formed of benzocyclobutene (BCB) is formed on an entire surface of the passivation layer 166 in order to planarize a surface of the array substrate. After that, portions of the planar layer 180 and passivation layer 166 over the drain electrode 172b are simultaneously patterned to form the third contact hole 181 exposing a portion of the drain electrode 172b. Then, a transparent conductive material is formed on the planar layer 180 having the third contact hole 181, and then patterned to form the pixel electrode 191 in the pixel region. As a result, the pixel electrode 191 electrically contacts the drain electrode 172b through the third contact hole 181.

As aforementioned, although the gate shorting bar has a double-layered structure, the gate shorting bar is easily cut when patterning the third metal layer to form the source and drain electrodes 172a and 172b because the second metal layer 152b of the gate shorting bar 154 has the Mo-Bridge 100. Further, since the first metal layer 152a of the gate shorting bar 154 is previously etched and the Mo-Bridge 100 has a neck shape having a width of about 4 micrometers, the gate shorting bar 154 is more easily cut and electrically separated. Additionally, if the Mo-Bridge 100 has a length of several micrometers, the Mo-Bridge 100 is stronger against the physical impact in the manufacturing process, thereby not easily separating from the first metal layer or breaking down.

Moreover, since the first metal layer 152a is previously etched, and the second metal layer 152b of the gate shorting bar 154 is made of the same material as the third metal layer, an additional wet-etching process and etchant are not required. Accordingly, an increased manufacturing yield is obtained.

It will be apparent to those skilled in the art that various modifications and variations can be made in the array substrate and the manufacturing method thereof of the present invention without departing from the spirit or scope of the inventions. Thus, it is intended that the present invention cover the modifications and variations of this invention provided they come within the scope of the appended claims and their equivalents.

What is claimed is:

1. A method of fabricating an array substrate for a liquid crystal display device, comprising the steps of:

forming a first metal layer on a substrate;

forming a second metal layer on the first metal layer;

patterning the first and second metal layers to form connecting lines including a bridge portion in the patterned second metal layer and to form a plurality of gate electrodes, gate lines, gate pads, shorting bars;

forming a gate insulation layer on the substrate to cover the patterned first and second metal layers;

forming an active layer and an ohmic contact layer over each gate electrode;

removing a portion of the gate insulation layer disposed on the bridge portion and a portion of first layer of the connecting line under the bridge portion;

forming a third metal layer on the gate insulation layer and on the bridge portion;

patterning the third metal layer so as to form a plurality of source electrodes and drain electrodes;

eliminating the bridge portions when patterning the third metal layer; and forming a passivation layer on the gate insulation layer, on the connecting line and on the patterned third metal layer.

2. The method of fabricating an array substrate according to claim 1, wherein each bridge portion has a width in the range of about 3.5 to about 4.5 micrometers and a length in the range of about 2 to about 8 micrometers.

3. The method of fabricating an array substrate according to claim 1, further comprising:

patterning the passivation layer so as to form a plurality of drain contact holes; and forming a plurality of pixel electrodes that contact respective drain electrodes through the drain contact holes.

4. The method of fabricating an array substrate according to claim 3, wherein the plurality of pixel electrodes are formed of a transparent material selected from a group consisting of indium tin oxide and indium zinc oxide.

5. The method of fabricating an array substrate according to claim 1, wherein the first metal layer includes at least aluminum.

6. The method of fabricating an array substrate according to claim 1, wherein the first metal layer is aluminum neodymium.

7. The method of fabricating an array substrate according to claim 1, wherein the second metal layer and third metal layer are molybdenum.

8. The method of fabricating an array substrate according to claim 1, wherein each bridge portion has a neck shape including first and second slanting portions.

9. The method of fabricating an array substrate according to claim 8, wherein the first slanting portion forms an angle in the range of about 20 to about 70 degrees with a line substantially parallel with the connecting line.

10. The method of fabricating an array substrate according to claim 8, wherein the second slanting portion forms an angle in the range of about 110 to about 160 degrees with a line substantially parallel with the connecting line.

11. The method of fabricating an array substrate according to claim 1, wherein the first layer of the connecting lines is separated into two parts by a distance of less than about 5 micrometers.

12. The method of fabricating an array substrate according to claim 1, wherein each gate electrode consists of two layers.

13. The method of fabricating an array substrate according to claim 12, wherein the first layer of the gate electrode is aluminum and the second layer of the gate electrode is molybdenum.

14. A method of fabricating an array substrate for a liquid crystal display device, comprising the steps of:

forming a buffer layer on a substrate;

forming a polycrystalline-silicon active layer on the buffer layer, the said active layer having an island shape;

forming a gate insulation layer on the buffer layer to cover the polycrystalline-silicon active layer;

forming a first metal layer on the gate insulation layer;

forming a second metal layer on the first metal layer;

patterning the first and second metal layer to form a gate electrode, a gate line and a gate shorting bar;

forming a source contact area and a drain contact area at both sides of the polycrystalline-silicon active layer;

forming an interlayer insulator on the gate insulation layer to cover the patterned first and second metal layers;

patterning the interlayer insulator and the gate insulation layer so as to form a first contact hole to the source contact area and a second contact hole to the drain contact area, patterning a portion of the interlayer insulator on the gate shorting bar so as to form an etching hole, eliminating a portion of the first metal layer of the gate shorting bar under the etching hole, and forming an bridge portion in the second metal layer of the gate shorting bar under the etching hole;

forming a third metal layer on the gate insulation layer and on the bridge portion;

patterning the third metal layer so as to form a source electrode and a drain electrode, and removing the bridge portion when patterning the third metal layer; and forming a passivation layer on the interlayer insulator and on the patterned third metal layer.

15. The method of fabricating an array substrate according to claim 14, wherein the first metal layer is an aluminum layer having a thickness of about 3000 angstroms.

16. The method of fabricating an array substrate according to claim 14, wherein the second metal layer is a molybdenum layer having a thickness of about 500 angstroms.

17. The method of fabricating an array substrate according to claim 14, wherein the third metal layer is a molybdenum layer having a thickness of about 500 angstroms.

18. The method of fabricating an array substrate according to claim 14, wherein the interlayer insulator is made of silicon nitride and has a thickness of about 7000 angstroms.

19. The method of fabricating an array substrate according to claim 14, wherein the bridge portion has a neck shape.

20. The method of fabricating an array substrate according to claim 19, wherein the neck-shaped bridge portion has a width of about 4 micrometers.

21. The method of fabricating an array substrate according to claim 19, wherein the neck-shaped bridge portion has a slanting portion.

22. The method of fabricating an array substrate according to claim 21, wherein the slanting portion forms an angle in the range of about 20 to about 70 degrees with a line substantially perpendicular to the gate shorting bar.

23. The method of fabricating an array substrate according to claim 19, wherein the neck-shaped bridge portion has a length in the range of about 2 to about 8 micrometers.

24. The method of fabricating an array substrate according to claim 14, wherein the gate insulation layer is formed of an insulating material selected a group consisting of silicon nitride and silicon nitride.

25. The method of fabricating an array substrate according to claim 14, further comprising the steps of:

forming a planar layer on the passivation layer;

patterning the planar layer and the passivation layer so as to form a drain contact hole to the drain electrode;

forming the transparent conductive material on the planar layer; and patterning the transparent conductive material so as to form a pixel electrode contacting the drain electrode through the drain contact hole.

* * * * *